(12) United States Patent
Yonezawa et al.

(10) Patent No.: US 7,086,370 B2
(45) Date of Patent: Aug. 8, 2006

(54) OUTBOARD MOTOR

(75) Inventors: Makoto Yonezawa, Wako (JP); Sou Abe, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 449 days.

(21) Appl. No.: 10/145,069

(22) Filed: May 14, 2002

(65) Prior Publication Data

US 2002/0173208 A1    Nov. 21, 2002

(30) Foreign Application Priority Data

May 15, 2001 (JP) .............................. 2001-144804
Sep. 3, 2001 (JP) .............................. 2001-265905
Sep. 3, 2001 (JP) .............................. 2001-265955
Sep. 3, 2001 (JP) .............................. 2001-266390

(51) Int. Cl.
    *F02B 61/04* (2006.01)
(52) U.S. Cl. ............................... 123/195 P; 440/88 R
(58) Field of Classification Search ................ 123/590, 123/195 P, 184.21, 196 W; 440/88 R, 89 R; 60/320, 321
See application file for complete search history.

(56) References Cited

U.S. PATENT DOCUMENTS

| 5,613,470 A | * | 3/1997 | Shiomi et al. ........... 123/195 P |
| 6,098,476 A | * | 8/2000 | Tsunoda et al. ........... 74/15.63 |
| 6,213,826 B1 | * | 4/2001 | Koishikawa et al. ...... 440/88 R |

FOREIGN PATENT DOCUMENTS

| JP | 63000128 | 1/1963 |
| JP | 58102725 | 7/1983 |
| JP | 62020793 | 1/1987 |
| JP | 09041967 | 2/1997 |
| JP | 09189221 | 7/1997 |
| JP | 09303155 | 11/1997 |
| JP | 2568292 | 1/1998 |
| JP | 10339162 | 12/1998 |

* cited by examiner

*Primary Examiner*—Henry C. Yuen
*Assistant Examiner*—Hyder Ali
(74) *Attorney, Agent, or Firm*—Adams & Wilks

(57) ABSTRACT

An outboard motor has an engine and a mounting case disposed below and connected to the engine. The mounting case has a depression opening upward. The opening is covered by a cover to form a coolant chamber. An exhaust passage passes through the coolant chamber and communicates with an exhaust expansion chamber formed by an extension case to be positioned below the mounting case. The coolant chamber is covered by the cover so that a small mating surface is formed with the coolant chamber independently of an engine mating surface of the mounting case. This simplifies the structure of the mounting case.

22 Claims, 27 Drawing Sheets

OUTBOARD MOTOR

FIELD OF THE INVENTION

This invention relates to an improvement in an outboard motor with an engine having a water-cooled exhaust manifold mounted thereto.

BACKGROUND OF THE INVENTION

This kind of outboard motor is disclosed, for example, in Japanese Utility Model Registration No. 2568292 entitled "Exhaust system of Outboard Motor." An exhaust passage of this exhaust system vertically passes through an exhaust guide. The exhaust passage is cooled by a coolant passage formed within the exhaust guide.

The coolant passage is blocked by a cover formed by a lateral extension of an oil pan provided above the exhaust guide. Since disposed below the engine, the oil pan becomes too large in its entire outer shape as a single component to block the upward opening of the coolant passage, and has poor mountability in blocking the coolant passage.

Next, a marine engine, for example, will be described. A marine engine takes in outside water as coolant for the engine. A coolant jacket is provided around an exhaust passage member to be exposed to high temperature. Outside water is taken into the coolant jacket for cooling the exhaust passage member. The exhaust passage member is an assemblage of a plurality of components such as an upstream exhaust manifold and an exhaust guide connected thereto, for improved productivity. This kind of marine engine is disclosed, for example, in Japanese Patent Laid-Open Publication No, HEI-9-303155 entitled "Exhaust Structure of V-Engine."

This exhaust structure provides exhaust passages of cylinders directed toward the inside of banks arranged in a V shape, having at each bank an exhaust collecting passage into which the exhaust passages from the cylinders merge. A lower end portion of the exhaust collecting passage is fitted into an inside collar so as to communicate with an exhaust passage of an exhaust guide. The exhaust collecting passage is connected to the exhaust passage of the exhaust guide via an inside rubber hose. The inside rubber hose is hermetically fitted with a fastening band having fasteners for fixing the inside rubber hose to a connecting part of the exhaust passage. A coolant jacket formed on the outer periphery of the exhaust collecting passage communicates with a coolant passage provided in the exhaust guide through a passage formed by the inside rubber hose and an outside rubber hose fitted to an outside collar integrally molded with the inside collar. The outside rubber hose is hermetically fixed to the outside collar via a fastening band having fasteners for fixing the outside rubber hose.

In the above exhaust structure, however, an upstream portion and a downstream portion have double pipes, the band-like connection hose is provided for each connection, and total four portions are fixed by the fastening bands fastened, resulting in poor workability in assemblage. Further, the elastic force of the rubber hoses and the bonding force of the fastening bands are used to resist the pressure of exhaust leaked from mating surfaces of the exhaust connections. Greater the forces, poorer the workability in assemblage.

Further, Japanese Patent Laid-Open Publication No. HEI-10-339162 entitled "Exhaust Structure of Outboard Motor" discloses a connecting structure of an exhaust passage, in which coolant is introduced into a space formed between upper and lower two seals provided at the connection between an upstream exhaust passage and a downstream exhaust passage. In the connecting structure of the exhaust passage of HEI-10-339162, however, the seals abut against walls defining the exhaust passage of the exhaust manifold, and are thus subjected to thermal effect of exhaust heat. Further, the seals are likely to be dislocated in the direction of the exhaust manifold. Furthermore, a sealing structure of a connection between an upstream water jacket and a downstream water jacket is unclear.

A water-cooled V-4 stroke engine for outboard motors is disclosed, for example, in Japanese Utility Model Laid-Open Publication No. SHO-63-128 entitled "Coolant Drain Passage of V-type Vertical Engine for Outboard Motor."

Further, an exhaust manifold having a coolant jacket for a water-cooled in-line engine outboard motor is disclosed, for example, in Japanese Utility Model Laid-Open Publication No. SHO-58-102725 entitled "Intake/Exhaust Manifold of Internal Combustion Engine for Outboard Motor" and in Japanese Patent Laid-Open Publication No. HEI-09-189221 entitled "Exhaust System for Outboard Motor."

Recent trend is to use a water-cooled V-4 stroke vertical engine with good fuel efficiency as the size of outboard motors is increased for higher power. This engine has a larger number of components than single or 2- to 4-cylinder in-line vertical engines, resulting in higher manufacturing cost than in-line engines and higher cost of an outboard motor. It is thus desired that the water-cooled V-type 4-stroke vertical engine have a reduced number of components by sharing components to reduce manufacturing cost.

Hereinafter, in terms of the sharing of components, SHO-63-128, SHO-58-102725 and HEI-09-189221 will be studied.

SHO-63-128 "Coolant Drain Passage" has coolant passing through a thermostat returned to an exhaust manifold, without disclosing an art related to the shape of mating surfaces of the exhaust manifold and a cylinder head, or the exhaust manifold.

SHO-58-102725 "Intake/Exhaust Manifold" has a thermostat case with a mating surface positioned above an exhaust connecting opening. When a cylinder head is inverted upside down, a coolant drain passage after inversion becomes a lower portion in the vertical direction. This is not suitable for a vertical engine in which heated coolant moves upward, preventing the use of the same cylinder head in the V-engine.

HEI-09-189221 "Exhaust System" has no passing of coolant at the mating surfaces of the exhaust manifold and the cylinder head, preventing the use of the same cylinder head for a V-engine when passing of coolant is conceived.

Further, during the passing of coolant between one cylinder head in one bank and an exhaust manifold in a V-engine, when coolant flows from a mating surface of the exhaust manifold into a coolant jacket in the cylinder head via a plurality of openings, merging of coolant flows produces interference in the coolant jacket of the cylinder head, preventing smooth flowing of coolant after absorbing combustion heat of the cylinder head, resulting in stagnating coolant in the coolant jacket.

Further, as a cooling system for an outboard motor, Japanese Patent Laid-Open Publication No. SHO-62-20793, for example, discloses a cooling system having a V-shaped auxiliary coolant passage. From the drawings, the auxiliary coolant passage is formed by drilling, and a water pump inlet is provided closer to a forward tilt shaft with respect to two coolant outlets. However, this cooling system forms the auxiliary coolant passages by drilling and has difficulties in processing holes, being complicated and troublesome, and disadvantageous in production.

Furthermore, Japanese Patent Laid-Open Publication No. HEI-09-41967 discloses "Cooling Structure for Outboard Motor" in which branching passages are formed in a lower portion of an oil pan of a V-engine. This cooling structure has the coolant branching passages consisting of the oil pan and a part connected to the lower portion of the oil pan, resulting in increase in the number of components and operation man-hours.

SUMMARY OF THE INVENTION

A first object of the present invention is to provide an outboard motor having a coolant chamber for cooling an exhaust passage formed in a mounting case in order to reduce the size and improve the mountability thereof.

A second object of the present invention is to provide a connecting structure of an exhaust passage of an engine such as a marine engine of an outboard motor, the connecting structure of a water-cooled exhaust passage of an engine providing reliable exhaust sealing, good mountability of and cooing performance for exhaust seals, and reduced thermal effects.

A third object of the present invention is to provide an outboard motor and a water-cooled 4-stroke V-type vertical engine suitable for an outboard motor which enable sharing of components including cylinder heads so as to reduce the number of components and the manufacturing cost of this type of engine.

A fourth object of the present invention is to provide an engine suitable for an outboard motor which solves the above-described related problems, the engine allowing, during the passing of coolant between one cylinder head (one bank in a V-engine) and an exhaust manifold, the smooth flow of coolant in a coolant jacket of the cylinder head by controlling the amount of flow of the coolant through the exhaust manifold and the cylinder head.

A fifth object of the present invention is to provide an outboard motor with a water-cooled V-engine mounted thereto, the outboard motor facilitating branch supply of coolant to coolant jackets of left and right banks of the engine by utilizing a component part of an oil pan, allowing left and right branch coolant supply ports to be formed without the need for machining such as drilling, and enabling smooth draining of coolant.

According to a first aspect of the present invention, there is provided an outboard motor which comprises: an engine subassembly including a cylinder head constituting part of a combustion chamber and a cylinder block; a mounting case having a mating surface for connecting the engine subassembly thereto and a depression opening upward; an extension case forming an exhaust expansion chamber below the mounting case; an exhaust manifold having an exhaust passage communicating with an exhaust port of the cylinder head; a cover covering an opening of the depression to form a coolant chamber; an inner passage passing through the coolant chamber, communicating with the exhaust passage of the exhaust manifold and with the exhaust expansion chamber; and a member for introducing coolant into the coolant chamber.

In the first aspect of this invention, the mounting case is provided with the depression opening upward, which opening of the depression is covered by the cover to form the coolant chamber around the exhaust passage of the exhaust manifold. The depression of the mounting case is covered by the cover so that a small mating face is formed on the coolant chamber independently of an engine mating face of the mounting case, resulting in good mountability and simplified structure of the mounting case. Since the structure of the mounting case provided with the coolant chamber is simple, the mounting case can be molded by high-pressure casting or the like, leading to production and cost advantages. Further, the inner passage communicating with the exhaust manifold and the exhaust expansion chamber is surrounded by the coolant chamber formed by the depression of the mounting case covered by the cover, so that the connection to the exhaust manifold has an inside/outside double structure which can absorb expansion and shrinkage due to molding error and heat.

In this outboard motor, the exhaust manifold has a coolant jacket, the coolant jacket communicating with the coolant chamber formed in the depression of the mounting case. Thus the communication of the depression of the mounting case with the coolant jacket of the exhaust manifold enables cooling of exhaust gas with water drained from the coolant jacket of the exhaust manifold into the depression of the mounting case.

Further, in the outboard motor of the present invention, the cover is fixed to the mounting case via a bolt in a position except a region in an outermost position of the mounting case. Thus the arranging of the fixing bolt in a position except the outermost part of the mounting case prevents the bolt connection from being in the outermost part of the mounting case, avoiding the lateral overhang of the mounting case with bolt connections circumferentially provided, thereby preventing the outboard motor from becoming larger.

According to a second aspect of this invention, there is provided an engine exhaust passage connecting structure, which comprises: a first exhaust passage member having a first exhaust passage; a second exhaust passage member having a second exhaust passage communicating with the first exhaust passage, the second member being connected to the first exhaust passage member; a connecting part of the first exhaust passage member, the connecting part having a wall defining the exhaust passage on an inner peripheral surface thereof and an annular protrusion formed outside the wall to be spaced apart from the wall; a connecting part of the second exhaust passage member, the connecting part having a wall defining the exhaust passage on an inner peripheral surface thereof and a wall in a region not defining the exhaust passage; a seal interposed between walls of the first and second exhaust passage members, the walls being distanced from the exhaust passage; and a coolant jacket formed outside the seal.

Thus in the exhaust passage connecting structure of the second aspect of this invention, since formed outside the seal, the coolant jacket has the seal immersed in the coolant, effectively cooling the seal. Further, since providing sealing between the walls distanced from the exhaust passage, the seal receives reduced thermal effect of exhaust, being prevented from deterioration due to heat, and thereby obtaining durability.

The wall not defining the exhaust passage of the second exhaust passage member is an annular protrusion fitted into an annular depression formed in the first exhaust passage member. The annular protrusion is thus thermally blocked by the annular depression, receiving reduced thermal effects of exhaust heat.

In the connecting structure of the present invention, the first and second exhaust passage members have coolant jackets on the outer peripheries of the exhaust passages, the coolant jackets communicating with one another, constituting part of the coolant jacket outside the seal. Thus the seal faces the coolant jacket and part of the coolant jacket faces the outside of the seal, so that the cooling of the exhaust passage and the connecting seal can be performed with a relatively simple structure.

The engine used in the connecting structure of the present invention is a marine engine. It is preferred that water outside a body accommodating the engine inside be introduced into the coolant jacket for cooling exhaust heat.

The annular protrusion of the first exhaust passage member has an engaging part formed on an outer peripheral surface thereof; and a part of a fitting portion of the seal fitted onto the annular protrusion is engaged with the engaging part. That is, the seal is reliably fitted onto the annular protrusion via the engaging part. With the seal fitted onto the annular protrusion, the mounting operation of two components, the first and second exhaust passage members, is easily performed, resulting in improved productivity. Further, since engaged with the engaging part, the seal can be removed with one component during the dissembling of the two components, leading to maintenance advantages.

The seal is preferably provided over at least two surfaces of an outer peripheral surface with the engaging part formed on the annular protrusion and an end surface of the annular protrusion. The fitting of the seal onto the annular protrusion is thus limited by the end surface of the annular protrusion, resulting in facilitated fitting.

According to a third aspect of the present invention, there is provided a V-type vertical engine, which comprises: a crankshaft disposed substantially vertically; cylinder blocks having a plurality of cylinders housing connecting rods connected to the crankshaft and pistons, the cylinders being aligned vertically with the axes forming a V in a plan view; two cylinder heads provided on the cylinder blocks, the cylinder heads having exhaust ports, respectively; and exhaust manifolds fixed to the cylinder heads, the manifolds having exhaust passages communicating with the exhaust ports, wherein: each of the cylinder heads has a coolant jacket and a mating surface for connecting the manifold thereto, the mating surface being formed with openings of the coolant jacket; each of the exhaust manifolds has a coolant jacket and a mating surface to be connected to the cylinder head, the mating surface being formed with openings of the coolant jacket; and the openings formed in the mating surface of the cylinder head are formed substantially symmetrically with respect to the horizontal center line of the mating surface.

In the engine according to the third aspect of this invention, the openings for passing coolant provided in the mating surface of the cylinder head with respect to the exhaust manifold are positioned substantially symmetrically with respect to the horizontal center line of the mating surface, so that a cylinder head of one kind is inverted to have the same opening positions. This enables the use of the same cylinder head through upside down inversion for the two cylinder heads constituting the V banks of the water-cooled 4-stroke V-type vertical engine. The use of only one kind of cylinder heads allows reduction in manufacturing cost. Further, the structure of the coolant passage between the cylinder head and the exhaust manifold is substantially the same, which facilitates the processing and mounting operations on an engine manufacturing line.

The engine further comprises: a thermostat valve provided to an assembly of the cylinder head and the cylinder block; an exhaust manifold positioned downstream of the thermostat valve and having a drain passage; and a pipe interposed between the thermostat valve and the exhaust manifold for communication between a passage with the thermostat valve provided thereto and the drain passage. Thus the opening of the drain of the coolant is not provided on the side surface of the cylinder head because of the drain passage downstream of the thermostat valve provided to the exhaust manifold. This more reliably enables the sharing of the cylinder heads.

According to a fourth aspect of the present invention, there is provided an outboard motor with a V-type vertical engine mounted thereto, which comprises: a crankshaft disposed substantially vertically; cylinder blocks having a plurality of cylinders housing connecting rods connected to the crankshaft and pistons, the cylinders being aligned vertically with the axes forming a V in a plan view; two cylinder heads provided on the cylinder blocks, the cylinder heads having exhaust ports, respectively; and exhaust manifolds fixed to the cylinder heads, the exhaust manifolds having exhaust passages communicating with the exhaust ports, wherein: each of the cylinder heads has a coolant jacket and a mating surface for connecting the manifold thereto, the mating surface being formed with openings of the coolant jacket; each of the exhaust manifolds has a coolant jacket and a mating surface to be connected to the cylinder head, the mating surface being formed with openings of the coolant jacket; and the openings formed in the mating surface of the cylinder head are formed substantially symmetrically with respect to the horizontal center line of the mating surface. The use of the above engine with moderate manufacturing cost as an outboard motor engine reduces the manufacturing cost of an outboard motor.

According to a fifth aspect of the present invention, there is provided a water-cooled engine, which comprises: a cylinder head having first exhaust passages with openings, a first coolant jacket, and a plurality of openings of the first coolant jacket provided around the openings of the first exhaust passages; an exhaust manifold having second exhaust passages with openings, a second coolant jacket, and a plurality of openings of the second coolant jacket provided around the openings of the second exhaust passages; and a flow controller for reducing the flow amount of coolant at a desired one of the openings of the first coolant jacket in the cylinder head as compared with that of the other openings.

In the engine of the fifth aspect of this invention, the coolant flow controller smoothes the flow of coolant within the coolant jacket in the cylinder head, providing efficient cooling. Such coolant flow control can be implemented with a simple structure in which the coolant flow controller is provided to a desired one of the openings of the coolant jacket of the cylinder head.

In the engine of the fifth aspect of this invention, a gasket is interposed between the first coolant jacket of the cylinder head and the second coolant jacket of the exhaust manifold; and at least one of a plurality of openings of the coolant jacket provided in the gasket is a through hole constituting the flow controller. The use of the gasket provides the flow controller consisting of the through hole, which eliminates the need for another flow controlling member. The structure of the flow controller is thus simplified, and the regulation of flow amount of coolant can be performed simply by the adjustment of the hole diameter of the gasket.

The through hole constituting the flow controller is provided in an upper portion of the coolant jacket corresponding to one cylinder. This prevents the generation of air stagnation which is likely to occur in an upper portion of the coolant jacket, resulting in the coolant jacket of the cylinder head free of generation of air stagnation and having good cooling efficiency.

As the above-described engine, a V-type vertical engine is used, which comprises: a crankshaft disposed substantially vertically; cylinder blocks having a plurality of cylinders housing connecting rods connected to the crankshaft and pistons, the cylinders arranged vertically with the axes forming a V in a plan view; and two cylinder heads provided on the cylinder blocks, respectively.

According to a sixth aspect of the present invention, there is provided an outboard motor with a water-cooled engine mounted thereto, which comprises: a cylinder head having first exhaust passages with openings, a first coolant jacket, and a plurality of openings of the first coolant jacket provided around the openings of the first exhaust passages; an exhaust manifold having second exhaust passages with openings, a second coolant jacket, and a plurality of openings of the second coolant jacket provided around the openings of the second exhaust passages; and a flow controller for reducing the flow amount of coolant at a desired one of the openings of the first coolant jacket in the cylinder head as compared with that of the other openings.

The application of this kind of water-cooled engine to an outboard motor preferably provides an outboard motor with good cooling performance and reduced manufacturing cost.

According to a seventh aspect of the present invention, there is provided an outboard motor with a water-cooled V-engine, which comprises: a V-engine having left and right banks; a coolant supply pipe supplying outside water pumped by a single pump as coolant to coolant jackets formed in the left and right banks, respectively; and an oil pan positioned below the engine, the oil pan having a mounting flange to be mounted to the engine, wherein: the mounting flange has an extension extending in a forward direction of the outboard motor, the extension being formed with a depression opening upward, the depression extending in left and right directions of the engine; an intake of the coolant supply pipe is connected to an intersection point of the left and right depression extensions; and outlets of coolant from the coolant jackets of the left and right banks are provided in rear portions of the depression extensions, opposite to the intersection point.

Thus in the outboard motor of the seventh aspect of this invention, the mounting flange of the oil pan to the engine is used to form the branching passages of coolant and the intake of coolant. This enables integral molding of these passages and opening during the molding of the oil pan. That is, the oil pan can be manufactured without the need for machining such as drilling for forming the coolant passage, coolant intake, and coolant outlets to the engine. This is thus advantageous in manufacturing the oil pan. Further, the coolant passage and the coolant intake/outlets are collectively arranged in the oil pan without increasing the number of components, resulting in advantages in the engine assemblage of the outboard motor.

BREIF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
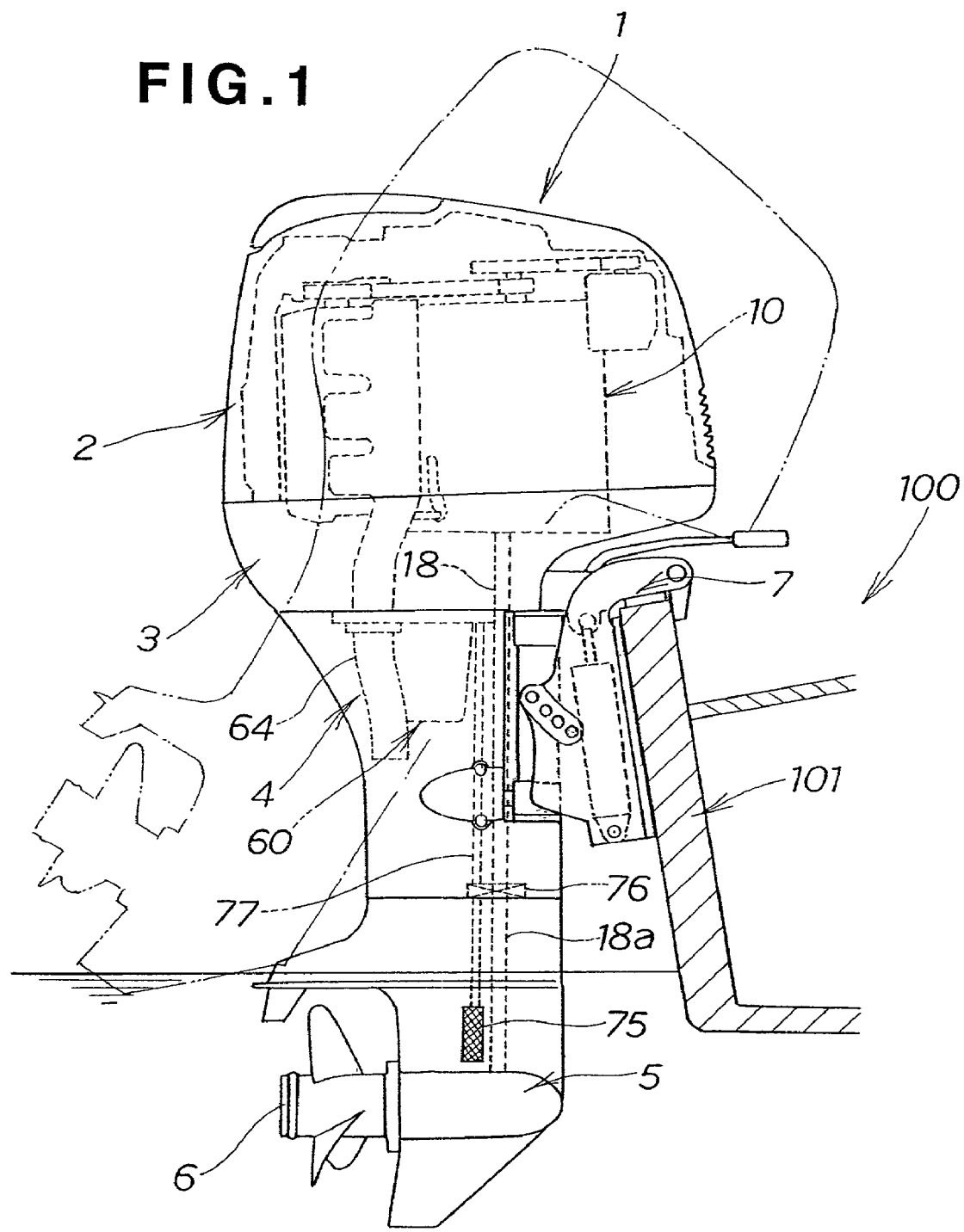
FIG. 1 is a side view illustrating an outboard motor mounted to a stern.

An outboard motor 1 shown in FIG. 1 has an engine cover 2 covering the top portion of an engine 10, an under cover 3 positioned below the engine cover 2, an extension case 4 positioned below the under cover 3, a gear case 5 positioned below the extension case 4, and a screw 6 protruding rearward from the gear case 5. These covers and cases and the screw give the external appearance of the outboard motor 1. The outboard motor 1 is mounted to a stern 101 of a hull 100 via a stern bracket 7 so as to be able to tilt (swing up and down) and swing left and right (move by steering). The main body of the present invention consists of the extension case 4 and the gear case 5. The tilted-up state of the outboard motor 1 is shown by chain lines.

Figure 2:
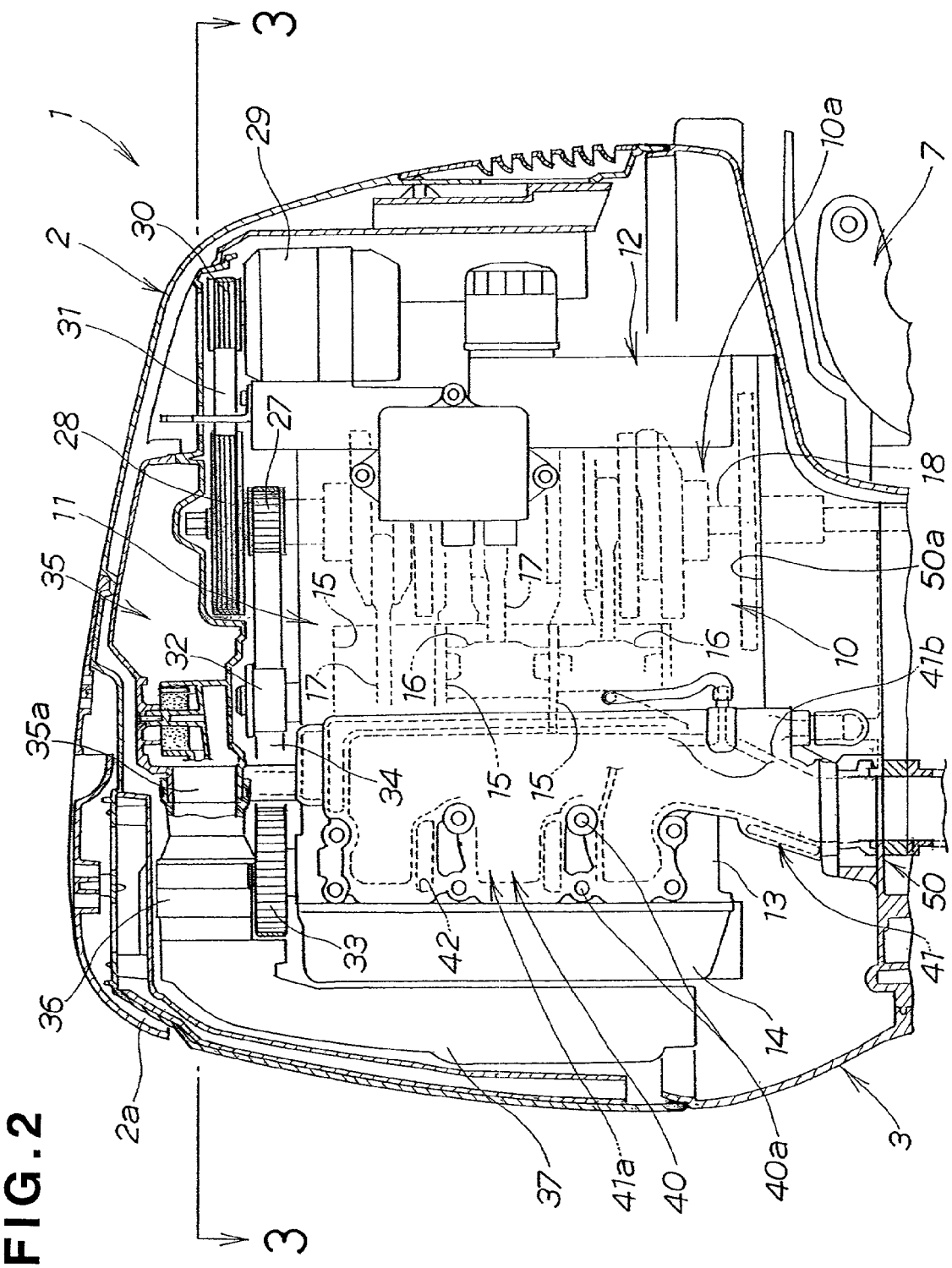
FIG. 2 is an enlarged cross-sectional view of an upper portion of the outboard motor with an engine cover shown in FIG. 1.
Figure 3:
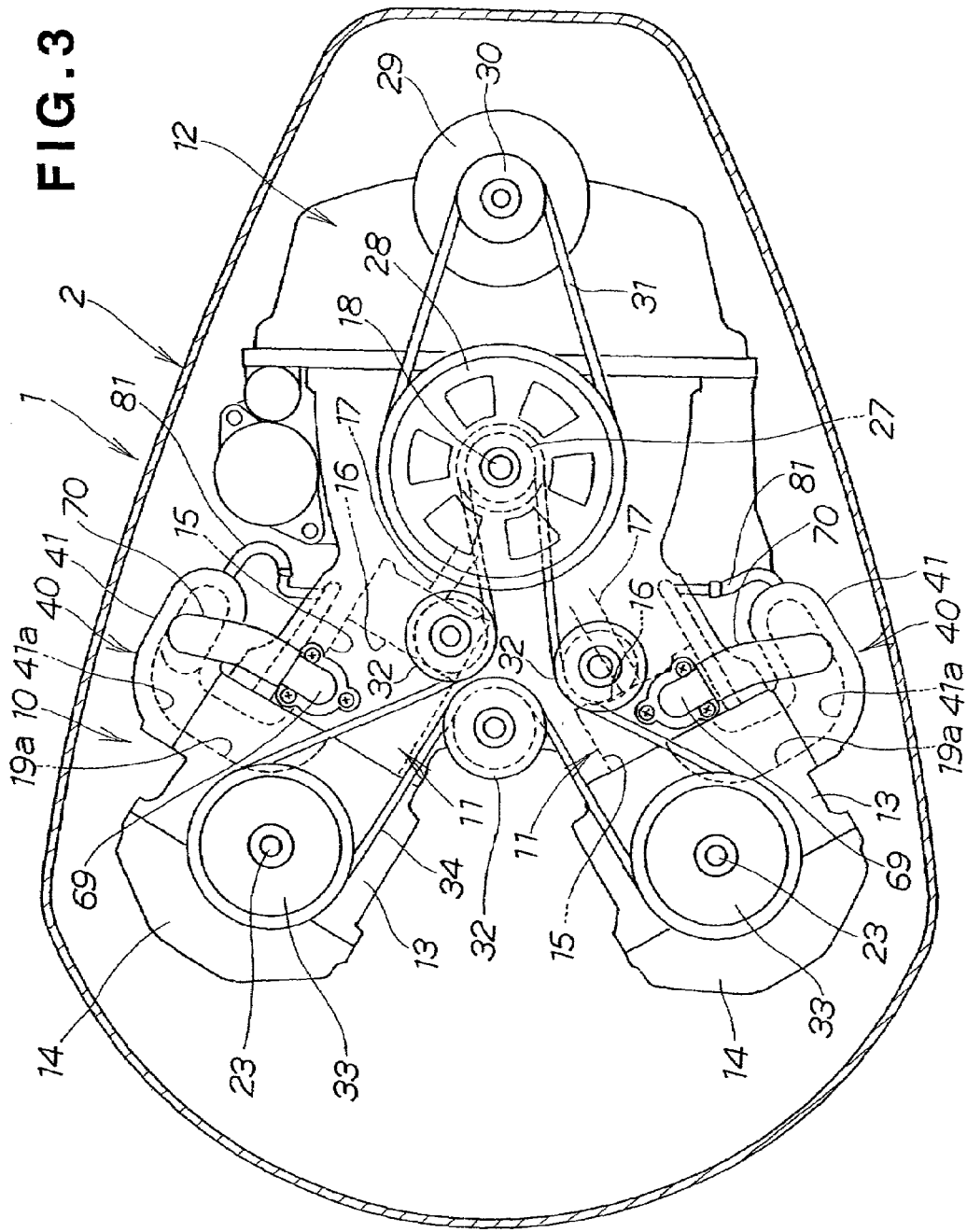
FIG. 3 is an enlarged cross-sectional view taken along line 3—3 in FIG. 2.
Figure 4:
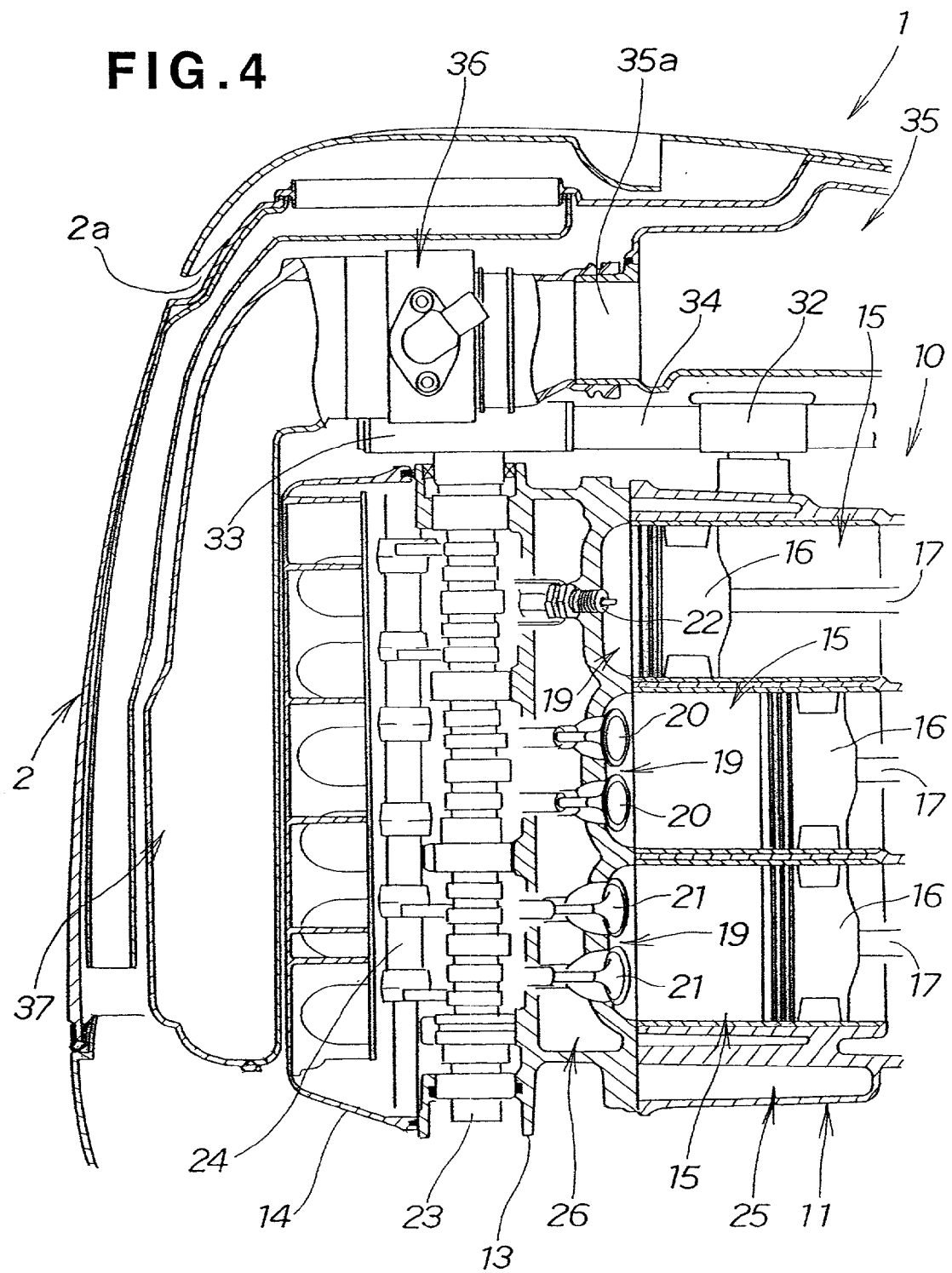
FIG. 4 is an enlarged cross-sectional view illustrating the relationship between cylinders, a cylinder head and a cylinder head cover in FIG. 2.

Next, with reference to FIGS. 2, 3 and 4, an upper structure of the outboard motor 1 is described. The engine 10 has cylinder blocks 11, a crankcase 12 positioned at the front of the cylinder blocks 11, cylinder heads 13 positioned at the rear of the cylinder blocks 11, and cylinder head covers 14 positioned at the rear of the cylinder heads 13.

Each of the cylinder blocks 11 has a plurality of cylinders 15 with horizontal axes, the cylinders 15 are aligned in parallel in a vertical direction. A piston 16 fitted in each of the cylinders 15 is connected to a vertical crankshaft 18 via a connecting rod 17. The engine 10 of the present embodiment is a so-called vertical engine.

The engine 10 illustrated in this embodiment is, as shown in FIGS. 2 and 3, a V-6 engine with three vertical sections, having a V-shape in a plan view.

As shown in FIG. 4, the cylinder head 13 has combustion chambers 19 constituting ceiling portions of the cylinders 15. Each of the combustion chambers 19 is provided with inlet valves 20, exhaust valves 21 and an ignition plug 22. A camshaft 23 is provided vertically outside the combustion chambers 19. A rocker arm shaft 24 disposed vertically supports valve rocker arms driven by the camshaft 23.

A cylinder coolant jacket 25 having intercommunicating paths is provided around the cylinders 15 of the cylinder blocks 11. A cylinder head coolant jacket 26 is also provided around the combustion chambers 19 of the cylinder heads 13, communicating with the coolant jacket 25.

An upper end portion of the crankshaft 18 is protruded above the crankcase 12 as shown in FIG. 2. Driving pulleys 27 and 28 are mounted to the upper end portion of the crankshaft 18 in vertically opposite positions. A generator 29 is disposed at an upper front portion of the crankcase 12. The upper pulley 28 is connected to a driven pulley 30 of the generator 29 via a belt 31 to drive the generator 29.

The lower pulley 27 is connected via a belt 34 and a plurality of guide pulleys 32 to camshaft pulleys 33, 33 provided at upper end portions of the camshafts 23, 23 in the left and right cylinder heads 13 shown in FIG. 3 so as to drive the camshafts 23, 23 shown in FIG. 4.

An intake silencer 35 is provided above the above-described belt/pulley mechanism. The intake silencer 35 has an intake duct 35a opening rearward. The intake duct 35a is connected to a throttle valve device 36 disposed above V-banks of the left and right cylinders.

The throttle valve device 36 is connected to an intake manifold 37 provided vertically at the rear of the V-banks of the left and right cylinders. The intake manifold 37 is connected to intake passages formed in the cylinder heads 13. The throttle valve device 36 and the intake manifold 37 constitute an induction system. Air is taken in from an air intake 2a of the engine cover 2.

Exhaust manifolds 40, 40 as shown in FIG. 2 are provided at the outer sides of the cylinder heads 13, 13 of the left and right cylinder blocks 11, 11. The exhaust manifolds 40, 40 are connected to exhaust passages of the combustion chambers 19 shown in FIG. 4.

The exhaust manifolds 40, 40 have a plurality of bodies 41 connected to the outer surfaces of the cylinder heads 13, 13 via a plurality of bolts 40a.

Each of the bodies 41 has a coolant jacket 42 provided around an exhaust passage 41a of the body 41. The coolant jacket 42 cools exhaust air discharged from the combustion chambers 19 at its most upstream portion.

Figure 5:
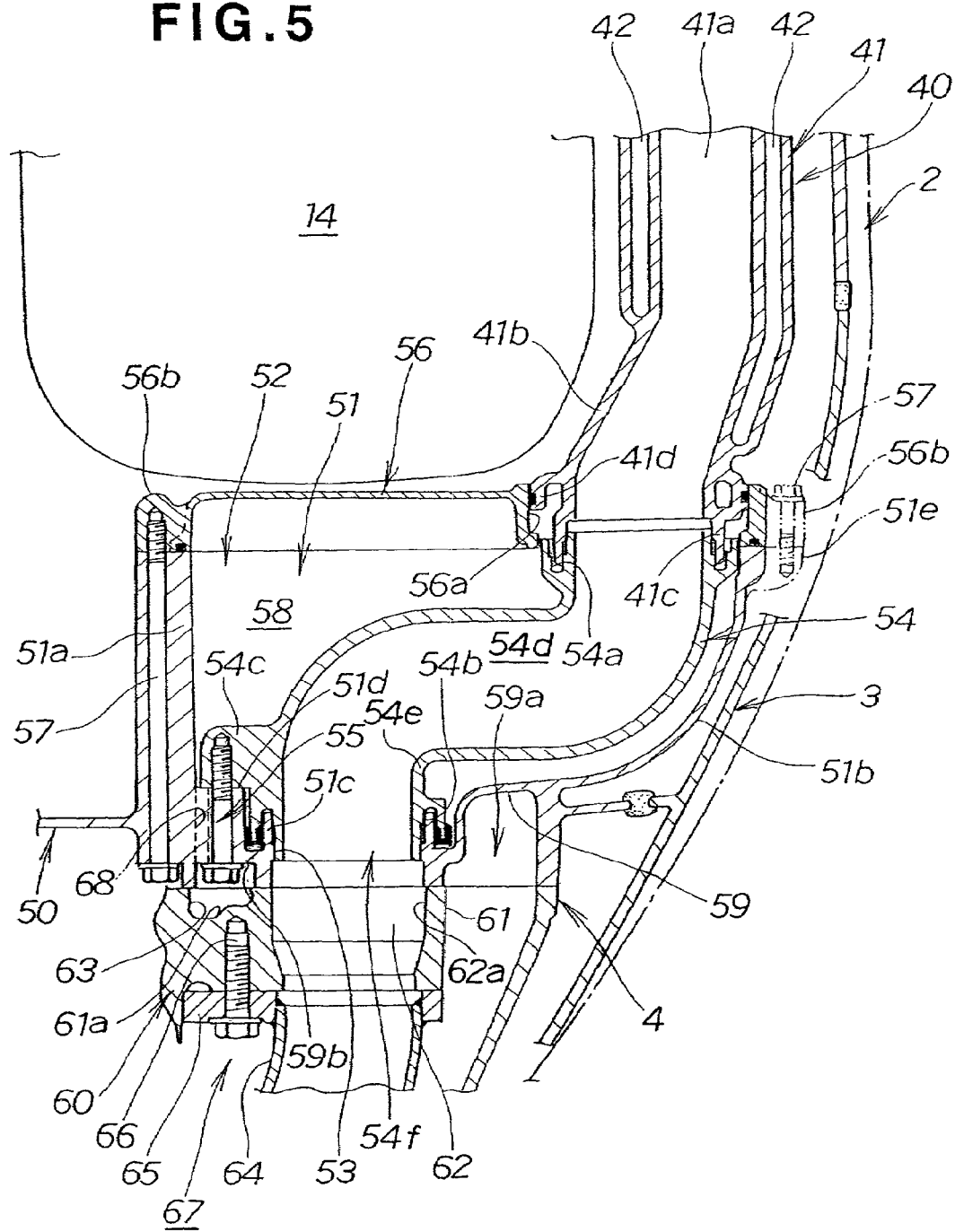
FIG. 5 is an enlarged cross-sectional view of an exhaust manifold, an intermediate exhaust pipe and an exhaust pipe.

Since the exhaust manifolds 40, 40 are provided at the outer sides of the left and right cylinder blocks 13, 13 as shown in FIG. 5, lower portions 41b, 41b of the left and right bodies 41, 41 are symmetrically inwardly inclined, and exhaust passages inside the lower portions 41b, 41b are also inclined inwardly.

Exhaust passages consist of the exhaust manifolds 40, 40, inner passages of amounting case to be described later, exhaust pipes, an exhaust expansion chamber, and the like.

The present embodiment provides, as described later, connections between the exhaust manifolds and the inner passages of the mounting case and between the inner passages of the mounting case and passages downstream thereof. The former connections are connections upstream of exhaust. The latter connections are connections downstream of exhaust.

Next, the relationship between the lower portion 41b of the exhaust manifold 40, the inner passage of the mounting case connected to the lower portion 41b, the exhaust pipe, and the exhaust expansion chamber with reference to FIGS. 2 and 5.

As shown in FIG. 2, the engine 10 has an engine subassembly 10a including the crankcase 12, cylinder blocks 11, cylinder heads 13, cylinders 15 and crankshaft 18. The engine 10 is disposed on a mounting case 50 and is supported on a mating surface 50a of the mounting case 50. An oil pan and part of the mounting case 50 have engine functions. However, an upper half portion of the engine 10 excluding these components is herein referred to as the engine subassembly 10a.

As shown in FIG. 5, the mounting case 50 is provided with depressions 51, 51 opening upward on the left and right sides (lateral sides of the outboard motor 1). The figure illustrates the right depression 51 of the mounting case 50. The left depression 51 not shown of the mounting case 50 has a shape and structure symmetrical with the right depression 51. Hereinafter the right depression 51 is referred to simply as the depression 51 for description. The depression 51 has an opening 52 in the top surface. An inner wall 51a forming part of the depression 51 is substantially vertical. An outer wall 51b is curved inwardly in a lateral direction. The bottom of the depression 51 has an annular protrusion 51c. The bottom of the annular protrusion 51c constitutes a circular hole 53.

The lower portion 41b of the body 41 of the exhaust manifold 40 is positioned at an outer portion of the opening 52 of the depression 51. The lower portion 41b has a lower annular protrusion 41c formed inside of the lower end of the lower portion 41b and an upper annular protrusion 41d formed in a position above and outside the lower annular protrusion 41c.

An intermediate exhaust pipe 54 in a substantially Z-shape is provided inside the depression 51, constituting the inner passage of the mounting case 50. An annular groove 54a is formed in an upper end portion of the exhaust pipe 54. The inside lower annular protrusion 41c formed at the lower portion 41b of the exhaust manifold body 41 is fitted into the annular groove 54a so as to connect the exhaust manifold 40 to the intermediate exhaust pipe 54. The intermediate exhaust pipe 54 has an annular groove 54b formed in a lower end portion thereof and a boss 54*c* formed at a portion of its internal part of the outboard motor.

A first exhaust passage 54*d* is formed by the intermediate exhaust pipe 54 providing communication between an upstream portion and a downstream portion of the exhaust passage. The intermediate pipe 54 is a first exhaust passage member. The first exhaust passage 54*d* is formed by the inner peripheral surface of a wall 54*e* of the intermediate exhaust pipe 54.

The annular protrusion 51*c* formed at the bottom of the depression 51 of the mounting case 50 is fitted into the lower annular groove 54*b* of the intermediate exhaust pipe 54. The lower portion 41*b* of the exhaust manifold body 41 communicates with the circular hole 53 formed in the bottom of the depression 51 via the intermediate exhaust pipe 54. That is, the intermediate exhaust pipe 54 constitutes an exhaust downstream connection in this embodiment. The intermediate exhaust pipe 54 corresponds to the first exhaust passage member. A peripheral portion of the circular hole 53 of the mounting case 50 corresponds to a second exhaust passage member.

The boss 54*c* of the intermediate exhaust pipe 54 is fitted on a step 51*d* formed on the bottom of the depression 51 and connected thereto via a bolt 55, thereby to mount the intermediate exhaust pipe 54 inside the depression 51.

The upper opening 52 of the depression 51 is entirely blocked with a cover 56 placed thereon. The cover 56 has a circular hole 56*a* formed in a portion thereof. The connection between the lower portion 41*b* of the exhaust manifold body 41 and the upper end of the intermediate exhaust pipe 54 is fitted in the circular hole 56*a* and fixed to the cover 56. The cover 56 has a boss 56*b* on the periphery thereof. A plurality of bolts 57 is vertically inserted between a portion of the inside part of the boss 56*b* and a portion of the inner wall 51*a* of the depression 51 to fix the cover 56 to the mounting case 50.

The cover 56 is connected to the periphery of the depression 51 at a plurality of portions. These portions are provided on the periphery of the depression 51 except the outermost part of the depression 51 (ahead and behind in FIG. 5) without affecting the outside dimension in the lateral direction of the outboard motor. FIG. 5 shows in chain double-dashed lines the boss 56*b* and the bolt 57 constituting the connection with another portion 51*e* of the periphery of the depression 51, which are, however, displaced to the right in the figure for illustrative purposes. This bolt arrangement avoids interference between the outermost portion of the mounting case 50 in the vicinity of the depression 51 and the under cover 3, meeting the requirements for reducing the size of the outboard motor.

The intermediate exhaust pipe 54 constitutes the inner passage of the mounting case 50. The space within the depression 51 formed in the mounting case 50 closed by the cover 56 forms a coolant chamber (coolant jacket) 58 surrounding the intermediate exhaust pipe 54. That is, in the outboard motor in its entirety, the mounting case 50 and the intermediate exhaust pipe 54 integrally constitute an engine supporting case.

The extension case 4 is disposed on the bottom surface of the mounting case 50. A depression 59*a* extending upward is formed in an outer bottom portion 59 of the depression 51 of the mounting case 50. The mounting case 50 including the depression 59*a* in the lower surface is connected to the upper surface of the extension case 4.

Further, an oil pan 60 is connected via a metal gasket not shown to the lower surface of the mounting case 50 inside the extension case 4. The oil pan 60 has a mounting part 61 for the mounting of an exhaust pipe 64. The mounting part 61 is formed with an extension of a portion of the oil pan 60 to mount the oil pan 60 to the mounting case 50.

The mounting part 61 is formed with a communicating part 62 of a hole communicating with the first exhaust passage 54*d*. The oil pan 60 is connected to the mounting case 50 in a manner that a wall surface 62*a* of the communicating part 62 is coplanar with a wall surface forming the circular hole 53 of the mounting case 50. Specifically, an upper portion of the communicating part 62 communicates with a downstream passage 54*f* of the intermediate exhaust pipe 54. The exhaust pipe 64 mounted to a stay 65 is connected to the lower end surface of the mounting part 61 of the oil pan 60 via a bolt 66 to communicate with the communicating part 62. Thus the intermediate exhaust pipe 54 and the exhaust pipe 64 are connected to one another for communication via the communicating part 62. Exhaust gas is discharged via the exhaust pipe 64 into an exhaust expansion chamber 67 constituting a space within the extension case 4.

As described above, the peripheral portion of the circular hole 53 of the mounting case 50 corresponds to the second exhaust passage member as the connection downstream of the intermediate exhaust pipe 54 in this embodiment. The second exhaust passage member may consist of the exhaust pipe mounting part 61 or the exhaust pipe 64, for example.

The mounting part 61 of the oil pan 60 has a depression 61*a* extending downward. The bottom 59 of the depression 51 of the mounting case 50 has a depression 59*b* extending upward, opposing the depression 61*a*. These two depressions 61*a* and 59*b* form a water passage 63. The water passage 63 is a passage transmitting a coolant pumped by a water pump to be described later. The water passage 63 communicates with the coolant chamber 58 via a connecting passage 68.

A drive shaft 18*a* shown in FIG. 1 connected to the crankshaft 18 for driving the screw 6 extends vertically through the extension case 4 as the body case and the gear case 5 and is connected to a gear mechanism within the gear case 5.

Next, lower and upper end connection structures of the intermediate exhaust pipe 54 as the first exhaust passage member constituting the first exhaust passage will be described with reference to FIGS. 6 to 9.

Figure 7:
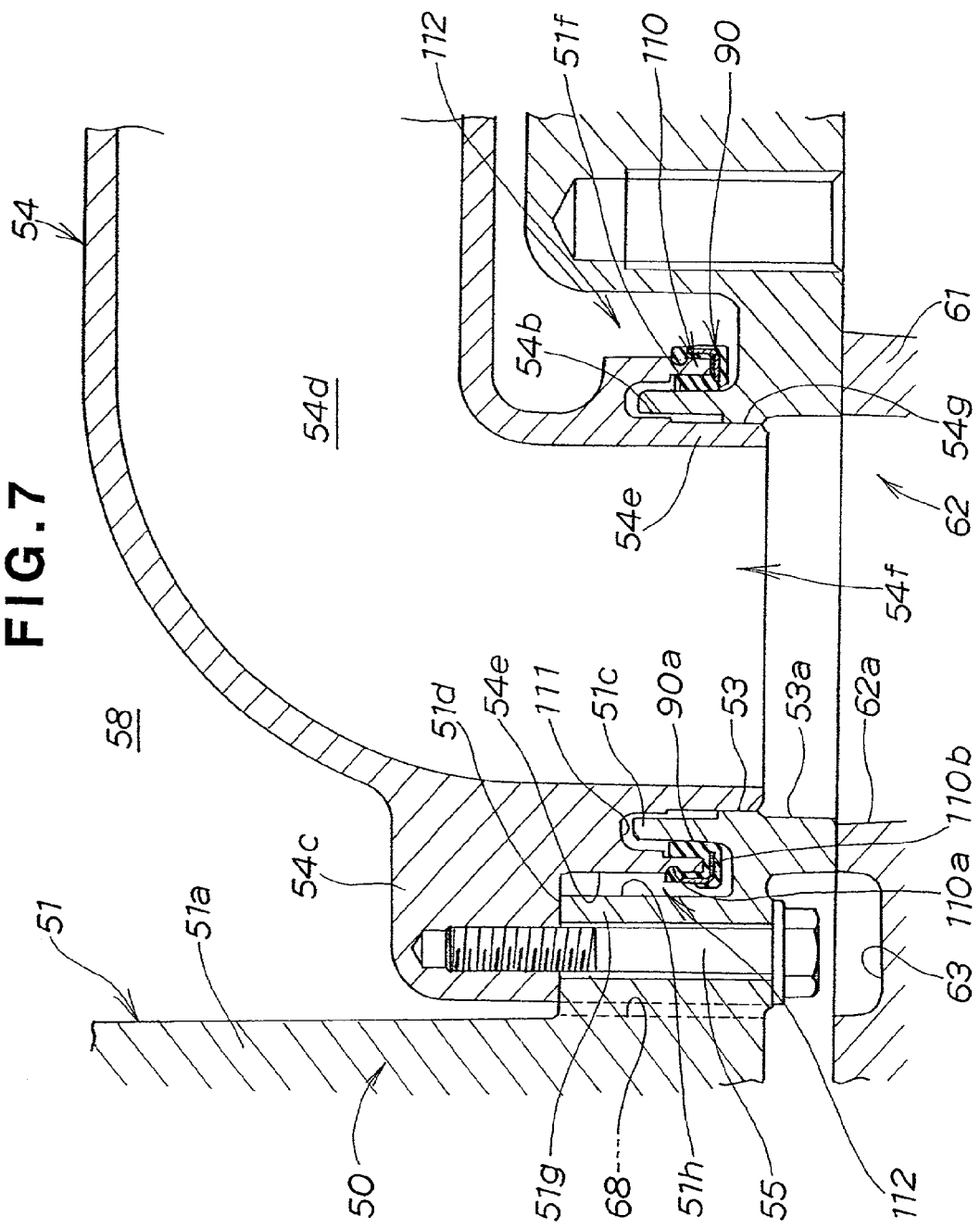
FIG. 7 is an enlarged cross-sectional view illustrating the connection of a downstream portion of the intermediate exhaust pipe.

An annular protrusion 110 extending downward as shown with enlargement in FIG. 7 is integrally formed at an outer peripheral portion of the lower end portion of the intermediate exhaust pipe 54. The annular protrusion 110 and an outer peripheral surface 54*g* of the lower end portion of the intermediate exhaust pipe 54 form an annular groove (annular depression) 111 opening downward. That is, the annular protrusion 110 is spaced with the annular groove 111 from the outer peripheral surface 54*g* of the lower end portion of the intermediate exhaust pipe 54.

Figure 6:
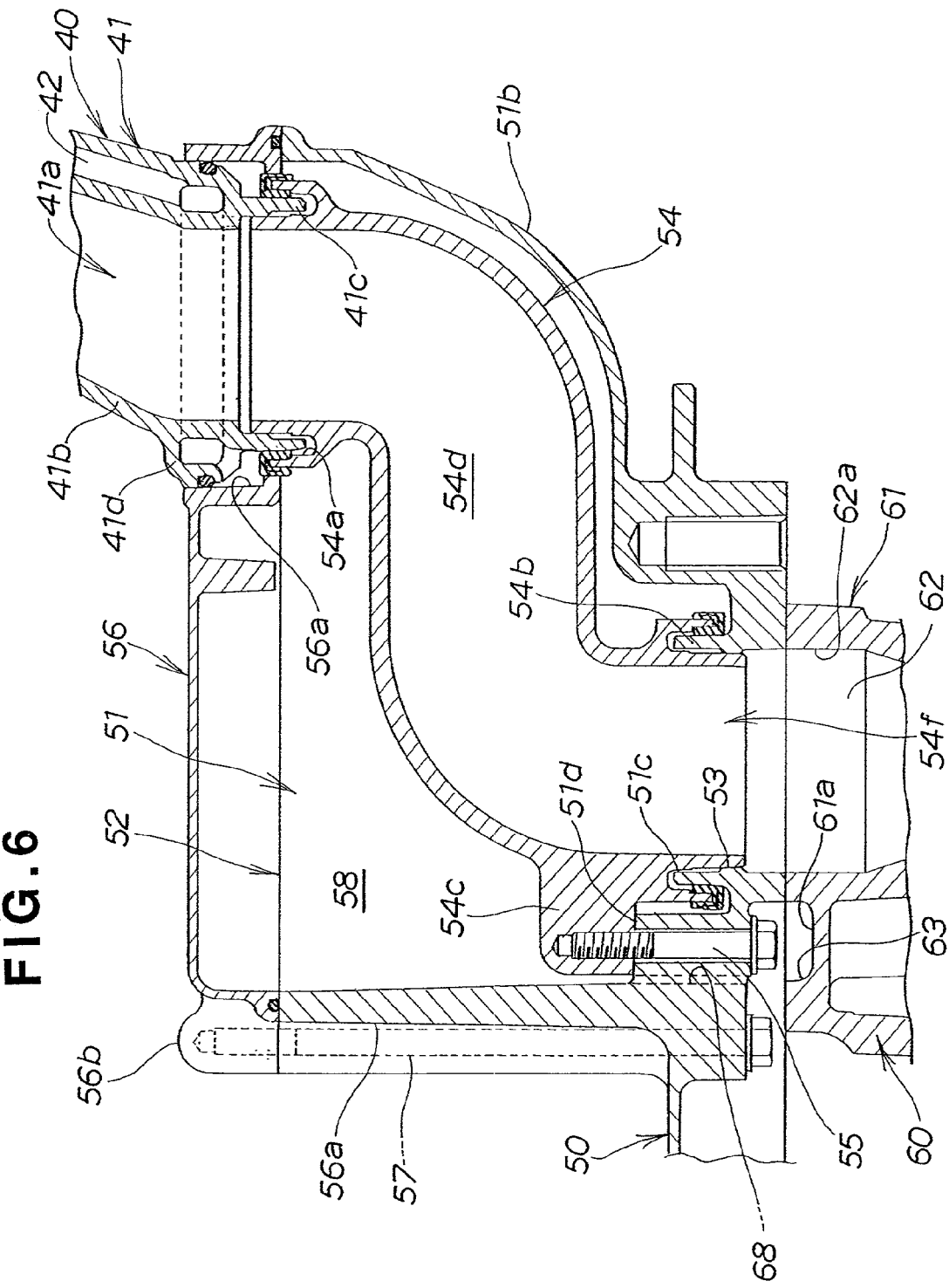
FIG. 6 is an enlarged cross-sectional view illustrating the relationship between the intermediate exhaust pipe and a coolant chamber.

An annular protrusion 51*c* standing on the periphery of the circular hole 53 formed in the bottom of the depression 51 of the mounting case shown in FIG. 6 is fitted with a predetermined clearance into the annular groove 111 (annular depression) formed with the annular protrusion 110, opening downward. The clearance is about 0.1 mm to 0.2 mm. Thus the annular groove 111 is put on the annular protrusion 51*c* for engagement with the predetermined clearance, so that the annular protrusion 51*c* does not directly face the exhaust passage of the second exhaust passage member. In other words, the annular protrusion 51*c* is isolated by the lower end portion of the intermediate exhaust pipe 54 from the exhaust passage of the second exhaust passage member, constituting a wall which is not part of the exhaust passage.

A ring-shaped seal 90 having a U-shaped cross section is fitted onto the annular protrusion 110 formed at the lower end portion of the intermediate exhaust pipe 54. The seal 90 abuts at its inner peripheral surface 90a on an outer peripheral surface 51f of the annular protrusion 51c of the depression 51 so as to provide air- and water-tight sealing between the annular protrusion 51c and the annular protrusion 110.

Figure 9:
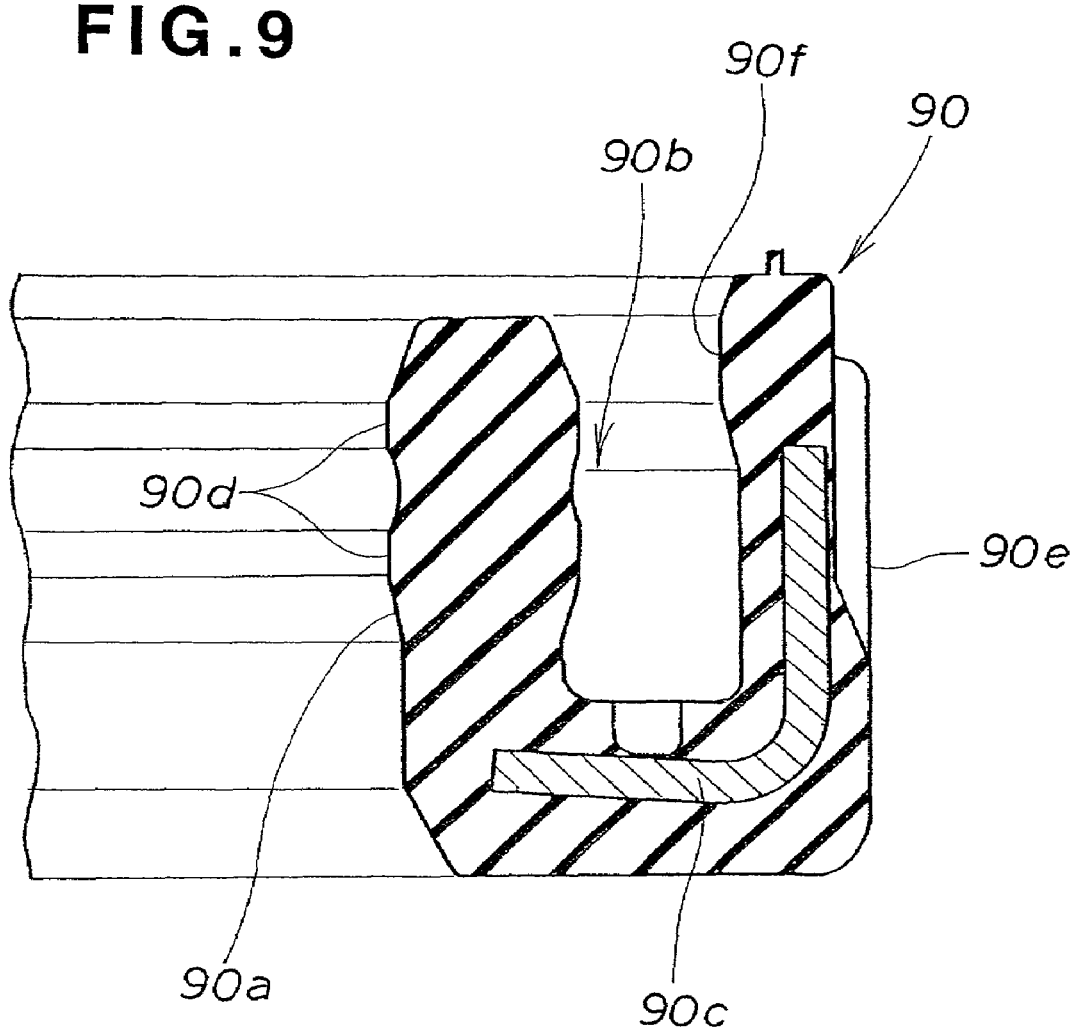
FIG. 9 is an enlarged partially cross-sectional view of a seal shown in FIGS. 7 and 8.

The seal 90 is illustrated in FIG. 9. The seal 90 has an L-shaped core bar 90c buried inside. The seal 90 has a depression 90b to have a U-shaped cross-section. Further, the seal 90 has the L-shaped core bar 90c buried in the outside portion and the bottom of the U shape, having a structure with an inside portion having elastic force. The depression 90b is pressed from the lower end onto the annular protrusion 110 so as to fit the seal 90 onto the annular protrusion 110.

The inner peripheral surface 90a of the seal 90 has a plurality of annular protrusions 90d extending inward. The annular protrusions 90d are arranged vertically on the inner peripheral surface 90a. The annular protrusions 90d increase the sealing performance with respect to the outer peripheral surface 51f of the annular protrusion 51c shown in FIG. 7.

The annular protrusion 110 shown in FIG. 7 has an engaging depression 110a formed on the outer periphery thereof. The engaging depression 110a is formed annularly on the outer periphery of the annular protrusion 110. An engaging protrusion (engaging part) 90f is formed on a surface of the external-diameter portion of the depression 90b of the seal 90. The engaging protrusion 90f is engaged with the engaging depression 110a so as to fit the seal 90 onto the annular protrusion 110. When the intermediate exhaust pipe 54 is pulled off upward in FIG. 7, the seal 90 is pulled off from the annular protrusion 51c together with the intermediate exhaust pipe 54 because the engaging protrusion 90f engages the engaging depression 110a.

The seal 90 is provided on at least two surfaces so as to cover the outer peripheral surface of the annular protrusion 110 formed with the engaging depression 110a and a lower end surface 10b of the annular protrusion 110. FIG. 7 illustrates an example of fitting the seal 90 onto the annular protrusion 110 so as to cover three surfaces, an inner peripheral surface, the lower end surface 110b and the outer peripheral surface of the annular protrusion 110.

A boss 51g having a step 51d on its upper surface is formed on the bottom of the depression 51. The boss 51g is connected to the boss 54c of the intermediate exhaust pipe 54 via a bolt 55. A space 112 is formed between a portion 51h near the coolant chamber 58 of the boss 51g and the annular protrusion 110 of the intermediate exhaust pipe 54. A coolant of the coolant chamber 58 also flows into the space 112. Thus the outer periphery of the ring-shaped seal 90 is exposed to the coolant in a lower portion of the coolant chamber 58.

The annular protrusion 51c of the mounting case 50 is spaced apart from the outer peripheral surface 54g of the downstream passage 54f of the intermediate exhaust pipe 54. The annular protrusion 110 of the intermediate exhaust pipe 54 is spaced apart from the exhaust passage 54d. The seal 90 provides hermetical sealing between the annular protrusion 51c and the annular protrusion 110 so that exhaust gas does not enter the space 112.

Since the annular protrusion 110 is spaced apart from the exhaust passage 54d and exposed to coolant, the wall temperature of the annular protrusion 110 is lower than that of other portions. The seal 90 is thus protected from the effects of heat generated from the first exhaust passage 54d and the downstream second exhaust passage (a portion 53a directly facing the exhaust passage of the circular hole 53 of the mounting case 50).

As described above, coolant within the coolant chamber 58 is used to cool the seal 90 hermetically sealing the connection between the first and second exhaust passage members 54 and 53, thereby to prevent the seal 90 from thermal degradation, improving the durability.

In the illustrated example, the annular protrusion 51c is provided to the second exhaust passage member 53, the seal 90 is fitted onto the annular protrusion 110, and the annular protrusion 51c is fitted into the annular groove 111. Alternatively, it is possible to provide a circular depression at the connection of the second exhaust passage member 53 so as to surround the circular hole 53 or the connecting passage 62 and to bring the annular protrusion 110 with the seal 90 fitted thereon into contact with a depressed step portion of the circular depression for sealing. In this case, the periphery of the seal 90 is immersed in the coolant as described above.

Figure 8:
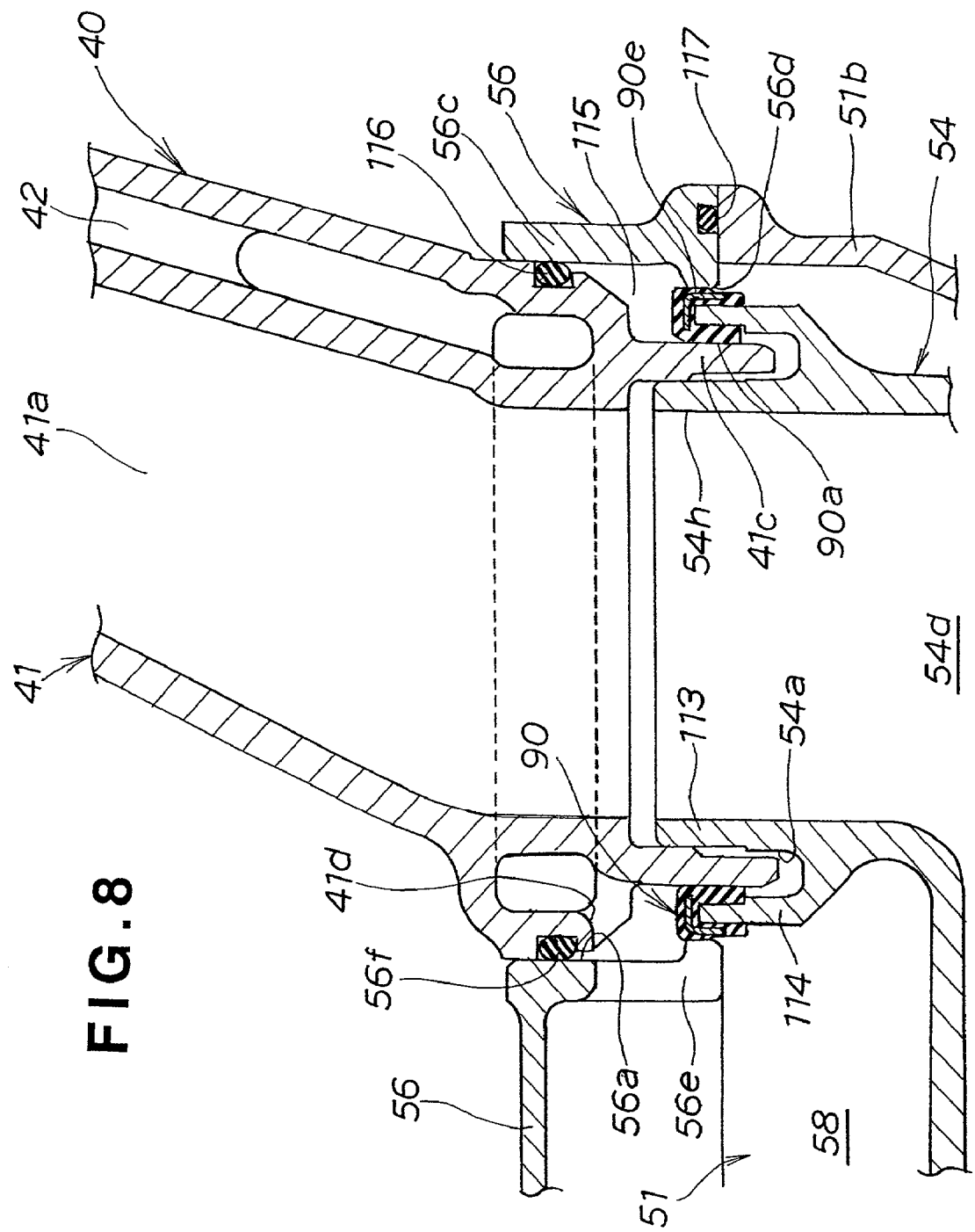
FIG. 8 is an enlarged cross-sectional view illustrating the connection between an upstream portion of the intermediate exhaust pipe and the exhaust manifold.

FIG. 8 illustrates the connection structure of the intermediate exhaust pipe 54 as the first exhaust passage member and the lower end portion of the exhaust passage 41a of the body 41 of the exhaust manifold 40 as an upstream second exhaust passage member.

The intermediate exhaust pipe 54 has at its upper portion an inside annular protrusion 113 having a wall surface 54h as an inner peripheral surface directly contacting exhaust gas, an outside annular protrusion 114 outwardly spaced apart from an outer peripheral surface of the inside annular protrusion 113, and an annular groove 54a formed between the inside and outside annular protrusions 113 and 114, opening upward. The annular protrusion 41c at the lower end portion of the exhaust manifold body 41 is fitted into the annular groove 54a. The lower end portion of the exhaust manifold 40 forms the exhaust passage 41a, consisting of a wall directly contacting exhaust gas and the annular protrusion 41c with no direct contact with exhaust gas.

The inside annular protrusion 113 constituting an upstream portion of the intermediate exhaust pipe 54 is fitted with a slight clearance onto an inner peripheral surface of the annular protrusion 41c at the lower end portion of the body 41 of the exhaust manifold 40 for communication between the exhaust passage 41a and the first exhaust passage 54d.

The seal 90 shown in FIG. 9 is fitted onto an upper end portion of the outside annular protrusion 114. The inner peripheral surface 90a of the seal 90 abuts on an outer peripheral surface of the annular protrusion 41c of the exhaust manifold body 41, providing air- and water-tight sealing between the outside annular protrusion 114 and the annular protrusion 41c.

An outer peripheral surface 90e of the seal 90 also contributes to the sealing of the coolant. Specifically, the outer peripheral surface 90e of the seal 90 abuts on a lower inner peripheral surface 56d of a tube 56c forming a circular hole 56e of the cover 56 for the depression 51, providing water-tight sealing between the lower inner peripheral surface 56d and the outside annular protrusion 114.

A first connecting passage 56e is formed in a portion of the inside part (left portion in FIG. 8) of the tube 56c. A coolant communicating space (coolant jacket) 115 formed by an outer peripheral surface of the annular protrusion 41c, an upper surface of the seal 90 and an inner peripheral surface of the tube 56c communicates with the coolant chamber 58 via the first connecting passage 56e. The seal 90 is cooled by the coolant of the coolant chamber 58.

The coolant jacket 42 is formed within the exhaust manifold body 41 to surround the exhaust passage 41a. The coolant jacket 42 communicates with the coolant communicating space 115 via a second connecting passage 41d formed in the exhaust manifold body 41.

An annular groove 56f is formed in the outer periphery of a lower end of the exhaust manifold body 41. An O-ring seal 116 is fitted into the annular groove 56f to provide water-tight sealing between the exhaust manifold body 41 and the cover 56, hermetically sealing the coolant communicating space 115. An O-ring seal 117 is fitted into an annular groove formed in a lower end surface of the cover 56 to provide sealing between the upper end surface of the outer wall 51b forming part of the depression 51 and the lower end surface of the cover 56.

Figure 10:
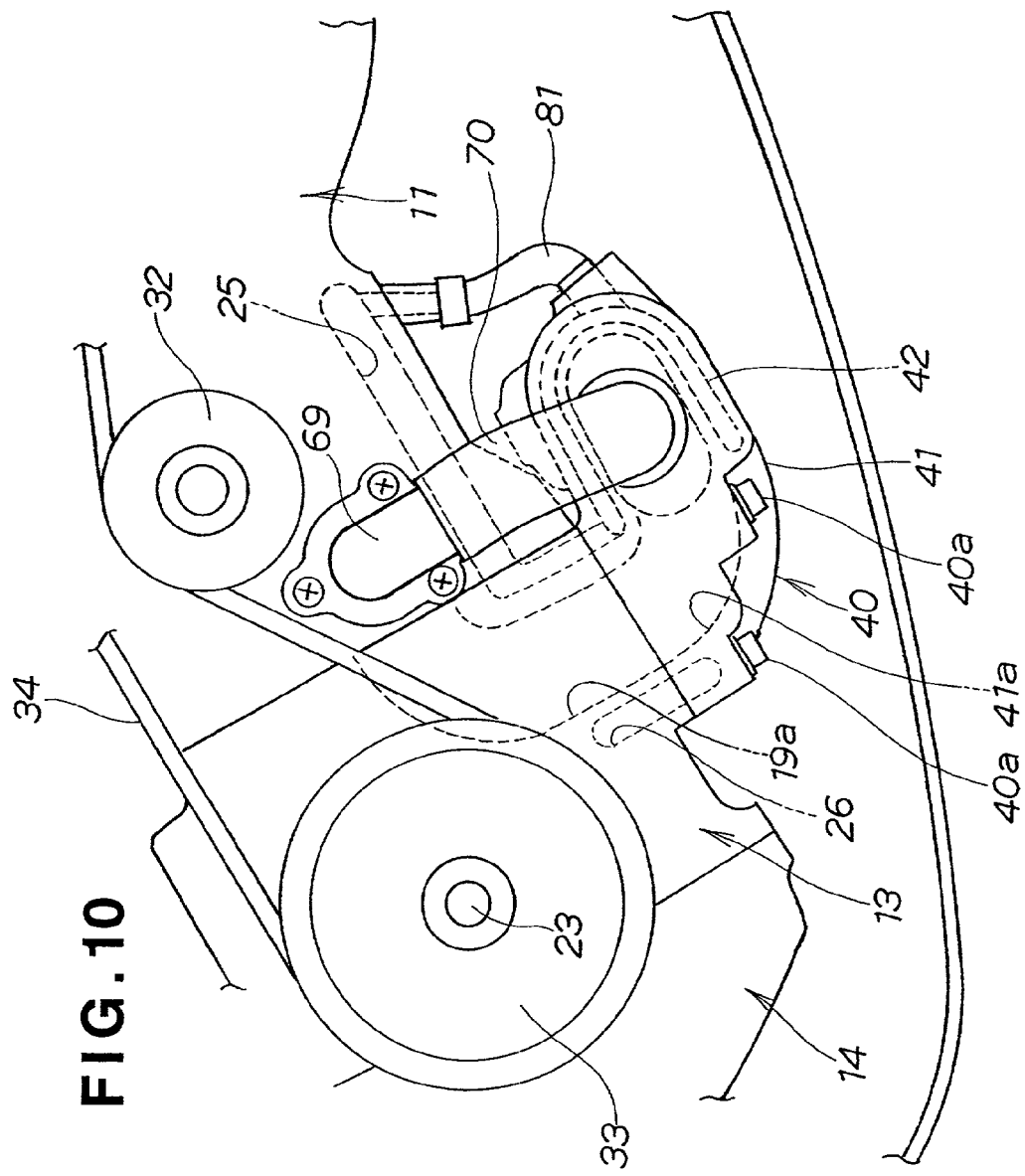
FIG. 10 is an enlarged plan view illustrating the mounting of the exhaust manifold to the cylinder head.
Figure 11:
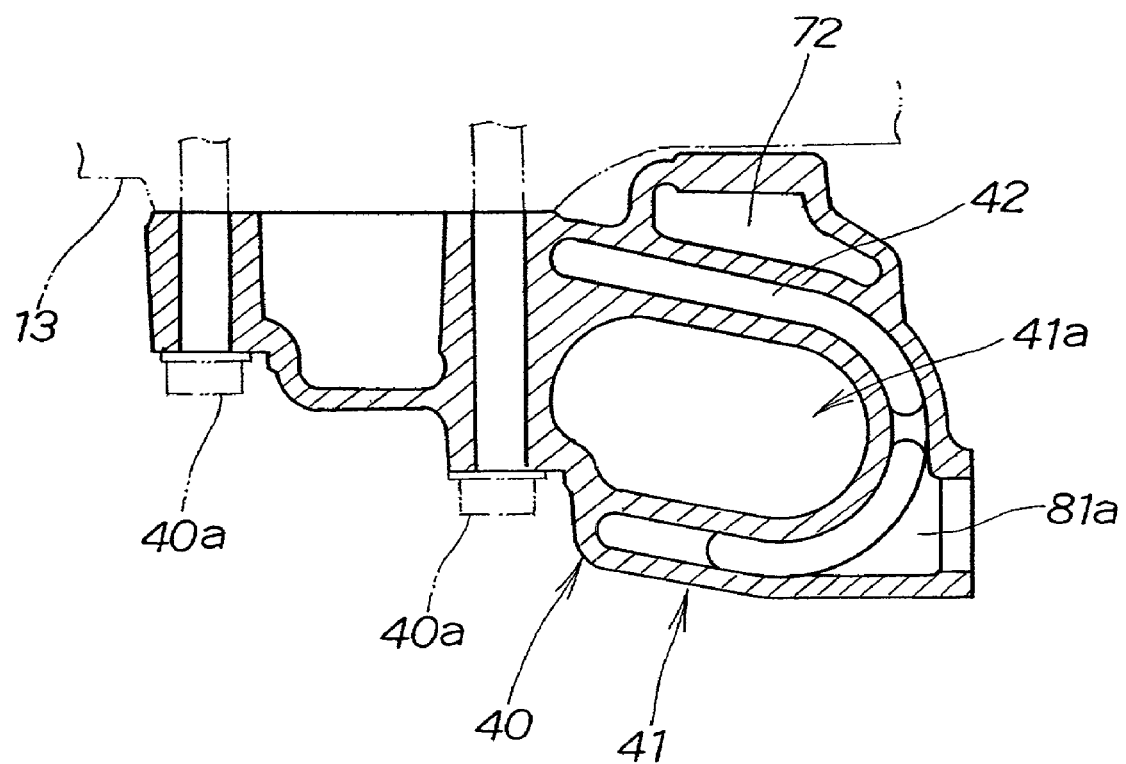
FIG. 11 is a horizontal cross-sectional view of the exhaust manifold shown in FIG. 10.

As shown in FIGS. 10 and 11, the exhaust manifold 40 is connected to the outside of the cylinder head 13 via a plurality of bolts 40a. The exhaust passage 41a of the exhaust manifold 40 communicates with an exhaust passage 19a of the combustion chamber 19 shown in FIG. 4, extending downward from the side of the cylinder head 13, and is connected to the intermediate exhaust pipe 54 shown in FIG. 8. The coolant jacket 42 is formed around the exhaust passage 41a formed within the exhaust manifold body 41. The coolant jacket 42 is partly connected to the cylinder coolant jacket 25 in the cylinder block 11 via a connecting hole 81a and a tube 81. A coolant jacket 26 disposed around the exhaust passage 19a of the combustion chamber 19 for cooling the exhaust passage 19a communicates with the coolant jacket 25 of the cylinder block 11. The tube 81 is connected to a drain pipe (not shown) for merging and discharging remaining water in the coolant jacket 25.

Figure 12:
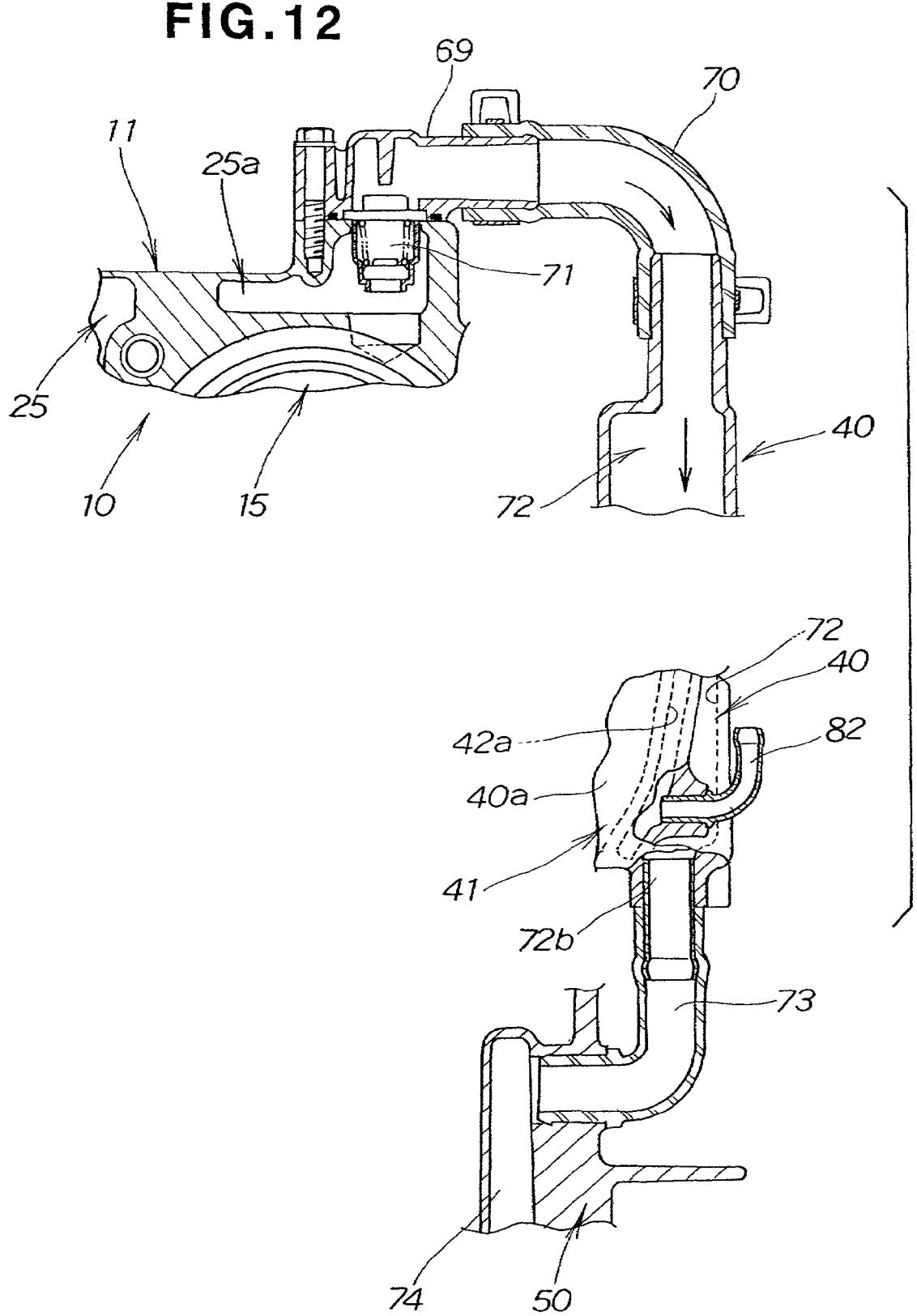
FIG. 12 is a cross-sectional view illustrating a coolant discharging structure of the cylinder block and a coolant discharging system of the exhaust manifold.
Figure 13:
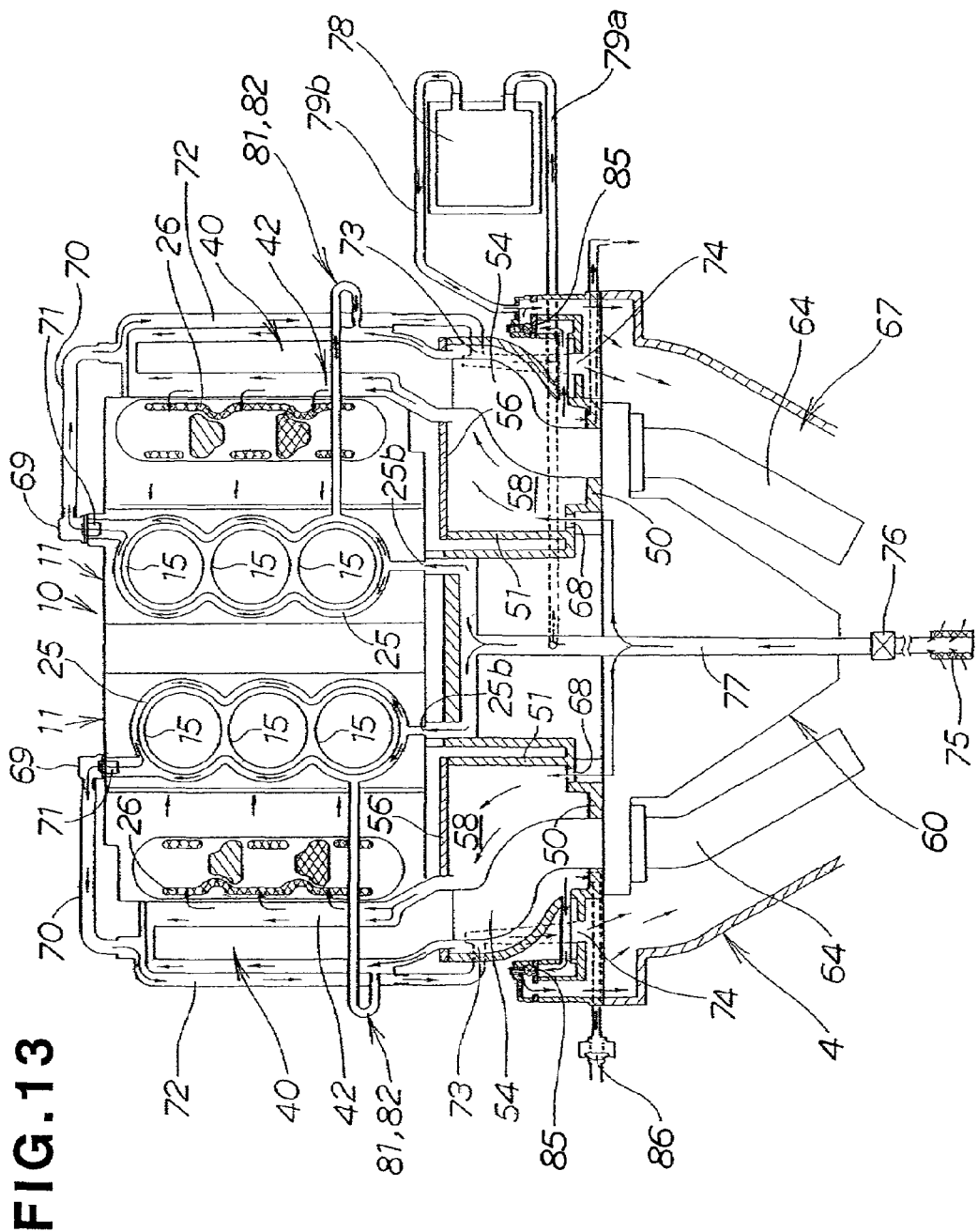
FIG. 13 is a schematic diagram illustrating flows of coolant.

A supply section to the coolant jacket 26 of the cylinder head 13 is, as shown in FIGS. 12 and 13, connected to a thermostat valve 71 positioned at a thermostat cover 69 in a pipe 70. That is, the thermostat valve 71 is provided at the uppermost portion of the coolant jacket 25 in the cylinder block 11. The thermostat valve 71 opens/closes upon detection of the coolant temperature of the engine, controlling the coolant temperature.

FIG. 12 illustrates a coolant drain path from a coolant outlet of the cylinder block 11 through the exhaust manifold to the exhaust expansion chamber.

Referring to FIG. 12, the coolant jacket 25 of the cylinder 15 positioned at the uppermost part of the cylinder block 11 communicates with a chamber 25a. The chamber 25a is connected to communicate with a drain passage 72 of the exhaust manifold 40 via the thermostat 71, thermostat cover 69 and pipe 70. When the coolant of the engine 10 exceeds a predetermined temperature, the thermostat 71 opens, discharging the coolant in the coolant jacket 25 into the drain passage 72 of the exhaust manifold 40.

The drain passage 72 communicates with a drain passage 74 opening into the exhaust expansion chamber positioned below the mounting case 50 via an outlet 72b (pipe) formed in a lower portion of the exhaust manifold 40 and an L-shaped joint 73. In FIG. 12, reference numeral 82 denotes a drain pipe for discharging remaining water in the coolant jacket 25 of the cylinder block 11 when a pump 76 (See 13) stops pumping coolant.

Next, a coolant circuit in an engine and an exhaust system will be described with reference to FIG. 13.

The cylinder blocks 11, 11 having the coolant jackets 25, 25 are provided at their outer surfaces with the exhaust manifolds 40, 40 having the coolant jackets 42, 42, respectively.

A coolant supply pipe 77 pumps seawater for cooling the cylinders 15 and the exhaust manifolds 40. The supply pipe 77 has a strainer 75 as an intake at its lower end. A pump 76 provided in the middle of the coolant supply pipe 77 above the strainer 75 performs the pumping of seawater as coolant. The pumped coolant is introduced via through holes 25b, 25b into the coolant jackets 25, 25 in the cylinder blocks 11, 11 as shown by arrows. The coolant pumped through the coolant supply pipe 77 is further introduced via the connecting passages 68, 68 into the coolant chambers 58, 58 to cool the inner passages (intermediate exhaust pipes or first exhaust passage members) 54, 54 of the mounting case 50. The coolant within the coolant chambers 58, 58 is further introduced into the coolant jackets 42, 42 of the exhaust manifolds 40, 40 to cool the exhaust manifolds 40, 40. Arrows indicate flows of the coolant. The coolant is introduced via the coolant jackets 42, 42 of the exhaust manifolds 40, 40 into the cylinder head coolant jackets 26, 26 to cool the cylinder heads 13, 13 shown in FIG. 4.

The coolant passing through the thermostats 71, 71 passes the drain passages 72, 72 of the exhaust manifolds 40, 40, cooling part of the exhaust passages, and is discharged from the drain passages 74, 74. The coolant in the coolant jackets 42, 42 and the cylinder blocks 11, 11 is further discharged through the drain passages 74, 74 into the exhaust expansion chamber 67 with exhaust gas.

The remaining water in the coolant jackets 25, 25 of the cylinder blocks 11, 11 is discharged from an intake 75 formed by the strainer 75 after the pump 76 stops its operation because the jackets 25, 25 are in connection with the water supply via the drain tubes 81, 82. Similarly, the coolant in the coolant jackets 42, 42 of the exhaust manifolds 40, 40 is discharged from the intake 75.

Water pressure relief valves 85, 85 for adjusting pressure in water passages from the pump 76 to the thermostat valves 71, 71 are provided in the left and right coolant chambers 58, 58. The water pressure relief valves 85, 85 are provided to connect the left and right coolant water chambers 58, 58 to the exhaust expansion chamber 67. When the coolant supply pressure from the pump 76 increases, the valve opens to discharge the coolant within the coolant chamber 58 into the exhaust expansion chamber 67 to regulate the supply pressure.

In this embodiment, seawater is pumped by the pump 76 in order to cool the engine 10. Thus a one way valve for cleaning/washing 86 is provided to connect a water hose outside the motor thereto to clean the coolant jackets with fresh water. The one way valve is normally closed and is opened for cleaning.

Reference numeral 78 shown in FIG. 13 denotes a coolant jacket for a paper separator. Reference numeral 79a denotes a coolant pipe 79 connected to the coolant supply pipe 77. Reference numeral 79b denotes a drain pipe for discharging water into the exhaust expansion chamber 67.

Next, the assembly of the exhaust passage of the mounting case 50 will be described.

① Assembly of Exhaust Passage of Mounting Case 50

As shown in FIG. 5, the intermediate exhaust pipe 54 is provided in the depression 51 of the mounting case 50, with the opening 52 of the depression 51 covered with the cover 56, and is temporarily fixed by the bolt 57.

② Connection of Engine Subassembly 10a to Mounting Case 50

As shown in FIG. 2, the engine subassembly 10a including the cylinder blocks 11, cylinder heads 13, and the crankcase 12 is disposed on the mating surface 50a of the mounting case 50 for connection.

③ Mounting of Exhaust Manifold

The exhaust manifold 40 is mounted to the cylinder head 13 shown in FIG. 2, coaxially placed on the intermediate exhaust pipe 54, and then fixed to the cylinder head 13. The bolt 57 shown in FIG. 5 is fastened to fix the cover 56 to the mounting case 50.

④ Mounting of Exhaust Pipe

The oil pan 60 is connected to the lower surface of the mounting case 50. The exhaust pipe 64 is then fixedly mounted.

Figure 14:
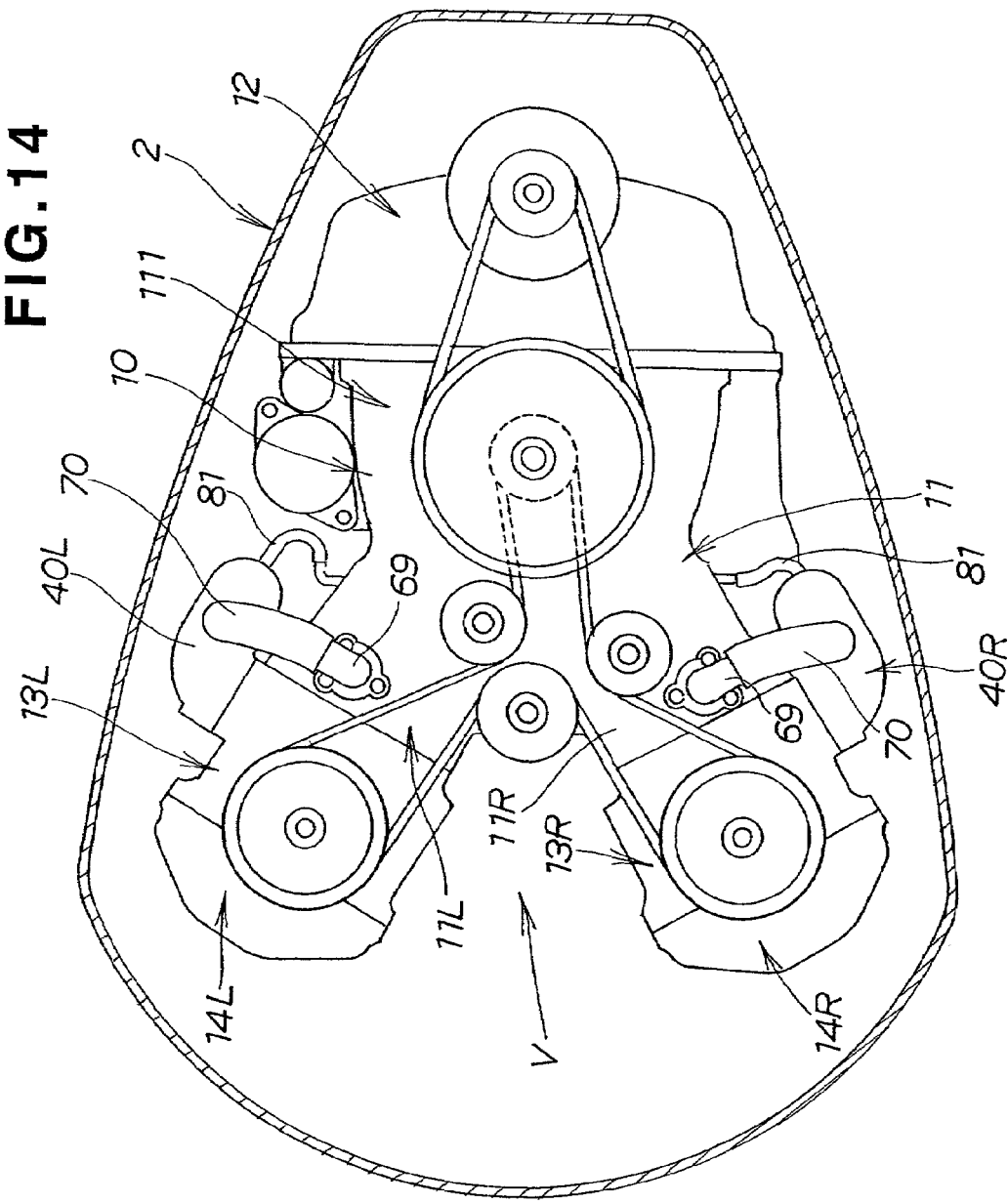
FIG. 14 is a diagram of FIG. 3 simplified.

FIG. 14 is a diagram of FIG. 3 with omitted parts.

The engine of this embodiment is a V-engine having V-shaped banks, with the two cylinder blocks 11L, 11R extending rearward in a V shape. Reference numerals 13L, 13R denote the left and right cylinder heads. The left and right exhaust manifolds 40L, 40R are disposed on the outer surfaces of the left and right cylinder heads 13L, 13R, respectively.

Figure 15:
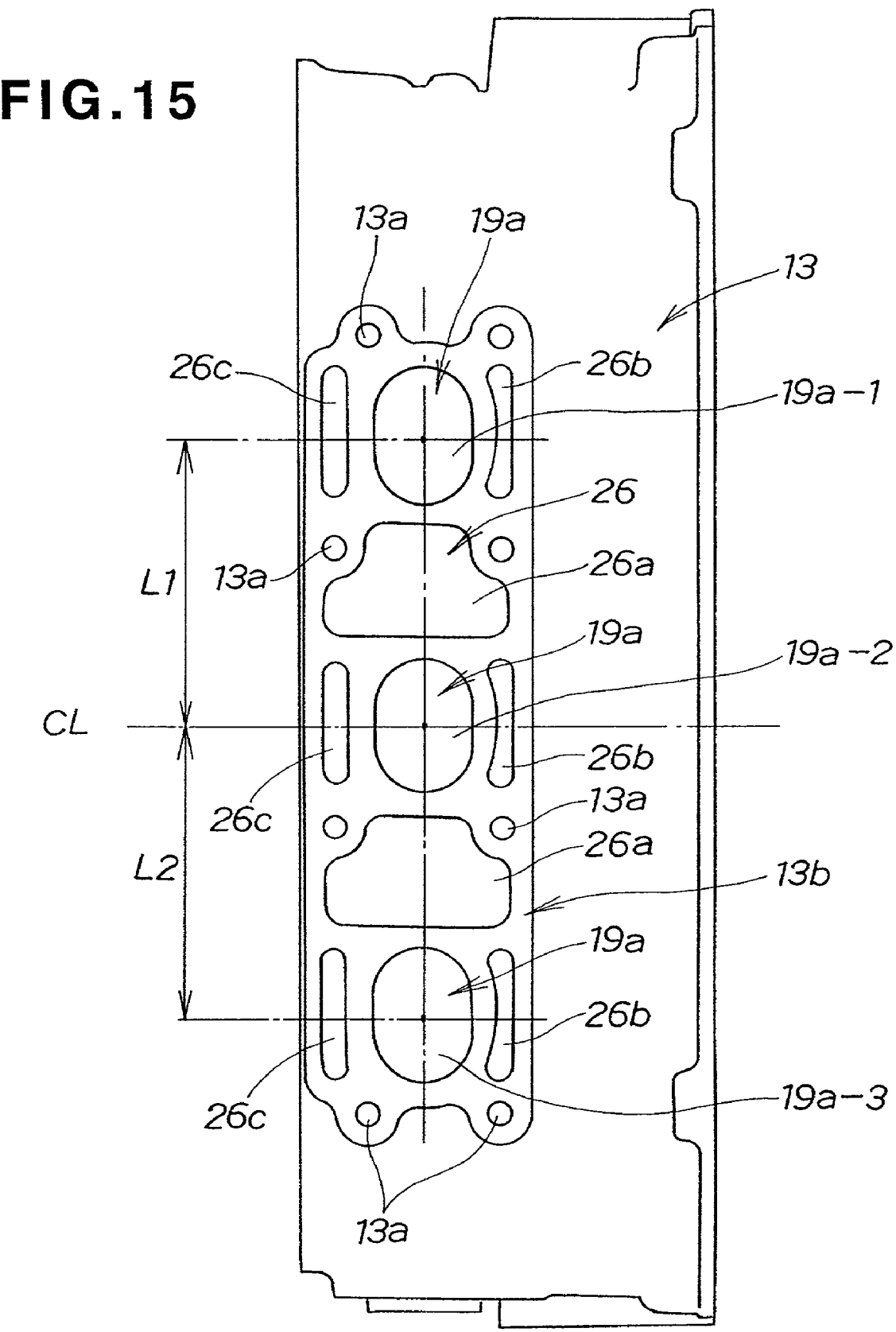
FIG. 15 is a side view of one cylinder head, illustrating a mating surface with the exhaust manifold.

FIG. 15 is a side view of the left cylinder head 13L (hereinafter referred to simply as a "cylinder head 13"), illustrating a mating surface 13b with the exhaust manifold 40.

Since the three sections of the V-engine are aligned vertically, three vertically elongate exhaust passages 19a open into the mating surface 13b of the cylinder head 13.

Below the uppermost opening 19a (denoted by reference numeral 19a-1) of the exhaust passage, a jacket portion 26a of the coolant jacket 26 surrounding the combustion chamber 19 shown in FIG. 4 opens. On the right and left of the opening 19a-1, right and left jacket portions 26b, 26c communicating with the jacket portion 26a open into the mating surface 13b.

Similarly, below the middle opening 19a (denoted by reference numeral 19a-2) of the exhaust passage, a jacket portion 26a of the coolant jacket 26 surrounding the combustion chamber 19 opens. On the right and left of the opening 19a-2, right and left jacket portions 26b, 26c communicating with the jacket 26a open into the mating surface 13b.

On the left and right of the lowermost opening 19a (denoted by reference numeral 19a-3) of the exhaust passage, right and left jackets portions 26b, 26c open into the mating surface 13b.

In other words, the jacket portions 26a, 26a of the combustion chambers 19 is provided above and below the middle exhaust passage opening 19a-2.

Among the three exhaust passage openings 19a provided vertically in the mating surface 13b of the cylinder head 13, the exhaust passage openings 19a-1 and 19a-3 positioned upper and lower is arranged symmetrically with respect to the center line CL of the middle opening 19a-2. Specifically, distance L1 between the center line CL of the middle opening 19a-2 and the center of the uppermost opening 19a-1 is set substantially equal to distance L2 between the center line CL of the middle opening 19a-2 and the center of the lowermost opening 19a-3.

The exhaust manifold 40 is connected to the mating surface 13b via bolts inserted through a plurality of bolt holes 13a formed in the mating surface 13b.

Figure 16:
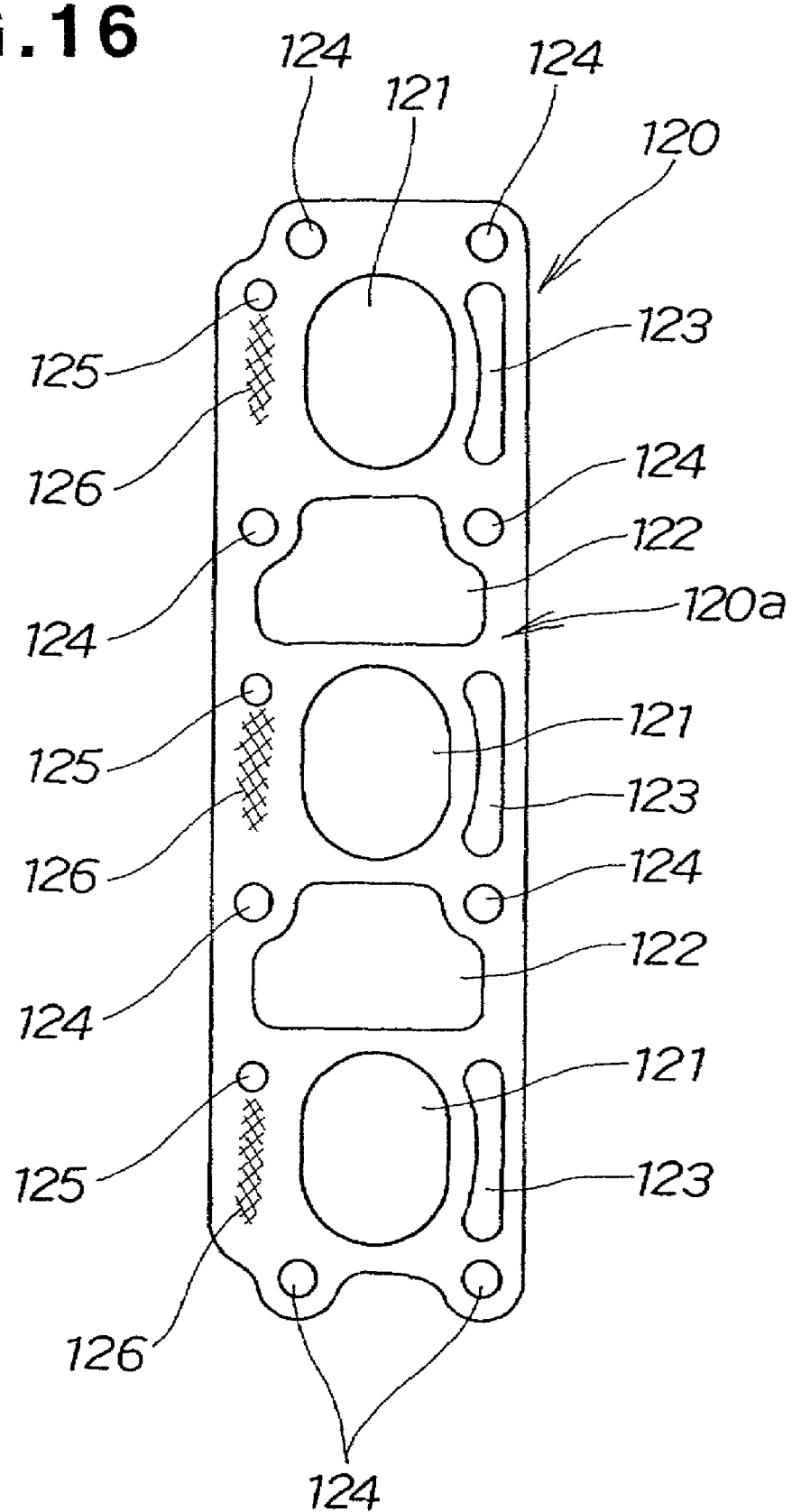
FIG. 16 is a front view of a gasket interposed between mating surfaces of the cylinder head and the exhaust manifold.

FIG. 16 illustrates a gasket 120 interposed between the mating surfaces of the cylinder head 13 and the exhaust manifold 40.

The gasket 120 has a shape to be overlaid on the mating surface 13b and has three vertically elongate exhaust passage openings 121 in a mating surface 120a. An opening 122 with the same shape as that of the jacket portion 26a shown in FIG. 15 is formed between the middle opening 121 and the uppermost opening 121. Another opening 122 is similarly formed between the middle opening 121 and the lowermost opening 121.

On the right of each exhaust passage opening 121, an elongate opening 123 of the same shape as that of the jacket portion 26b shown in FIG. 15 is formed. The gasket 120 further has a plurality of holes 124 formed in correspondence with the bolt holes 13a shown in FIG. 15.

In a left upper portion of each exhaust passage opening 121 formed in the gasket 120, a control hole 125 is formed. The control hole 125 constitutes a coolant flow controller. The flow control hole 125 is positioned in an upper portion of the left jacket portion 26c (left in the figure) closer to the combustion chamber 19 of the cylinder head 13 shown in FIG. 15. A portion below each flow control hole 125 shown in FIG. 16 (portion indicated with mesh) is a shield 126 for shielding the left jacket portion 26c from a vertically middle portion to a lower portion thereof. The shields 126 shield the jackets 26c to limit coolant flowing into the jacket portions 26c from the jacket 42 of the exhaust manifold 40. Through the flow control holes 125, coolant from the jacket 42 flows into the jacket portions 26c of the cylinder head 13. That is, the flow amount of coolant flowing from the jacket 42 into the jacket portions 26c is regulated by the flow control holes 125.

The setting or adjustment of the amount of coolant flowing into the jackets 26c of the cylinder head 13 can be made as desired through the setting and adjustment of the opening areas of the flow control holes 125.

Figure 17:
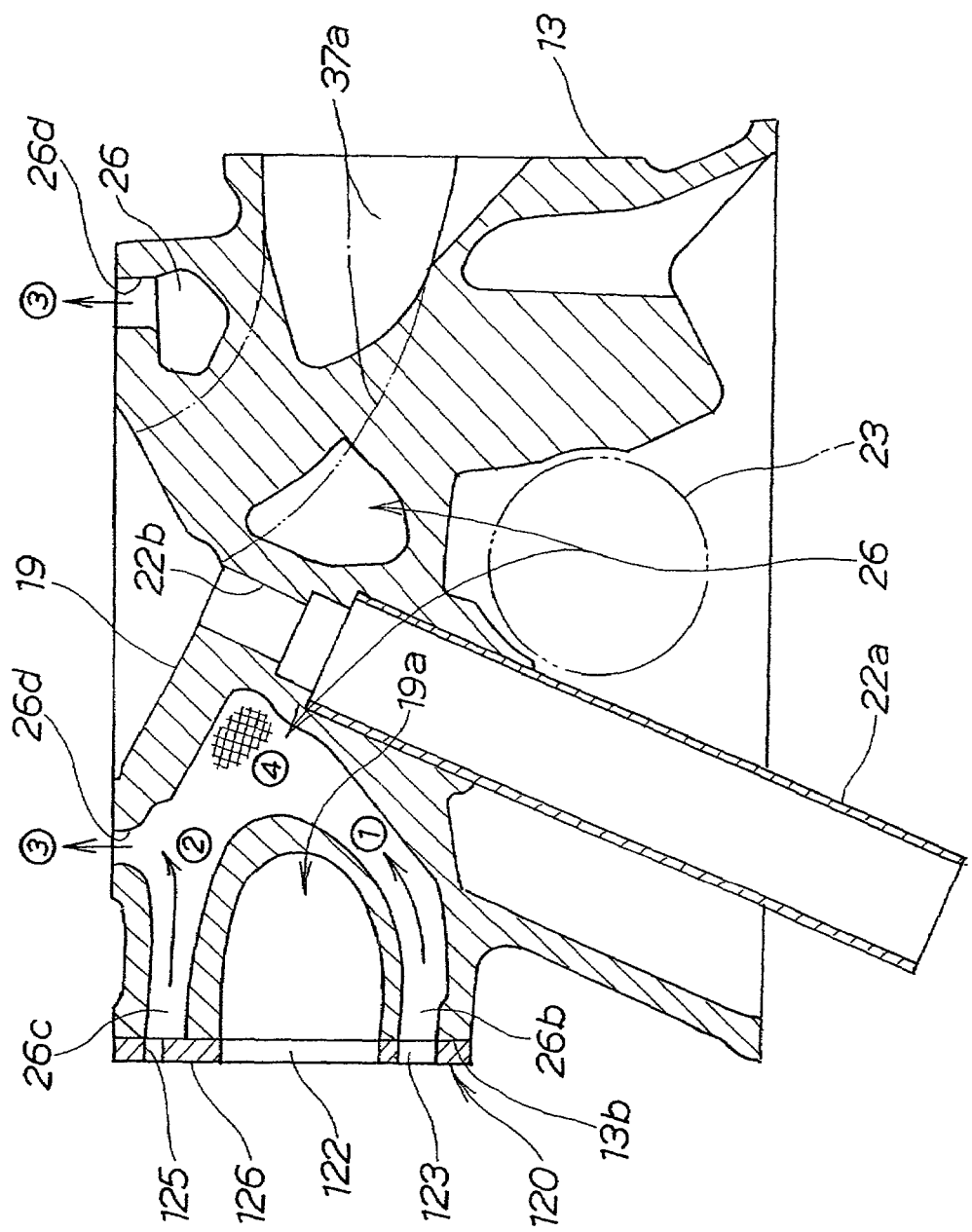
FIG. 17 is a cross-sectional view illustrating the connection of the gasket to the cylinder head.

FIG. 17 illustrates the cylinder head 13 with the gasket 120 having the flow control holes 125 as the flow controller connected to the mating surface 13b.

In FIG. 17, reference numeral 37a denotes an intake passage, and reference numeral 19 denotes a combustion chamber. Reference numeral 22a denotes a sleeve for the ignition plug. Reference numeral 22b denotes a hole into which the front end of the ignition plug is fitted. Reference numeral 23 denotes a camshaft. The gasket 120 shown in FIG. 17 is made thicker than the actual thickness for purposes of illustration. The exhaust manifold 40 is connected to the left side of the gasket 120. A cylinder block and cylinder are disposed above in FIG. 17, which are omitted to avoid complication of the figure.

The vertically elongate opening 123 of the gasket 120 corresponds with the jacket portion 26b. Coolant flows from the jacket 42 of the exhaust manifold 40 through the openings 123 and the jacket portions 26b as shown by arrow ① into an outside portion of the ceiling portion of the combustion chamber 19.

Coolant also flows from the jacket 42 of the exhaust manifold 40 through the flow control holes 125 as shown by arrow ② into the jacket portions 26c. Coolant within the cylinder head coolant jackets 26 cools the cylinder head 13 and thereafter transmitted as shown by arrows ③, ③ into the circumference of the cylinders 15 of the cylinder block 11 as shown in FIG. 4 to cool the cylinder block 11.

With respect to the flow of coolant shown by ① and ②, if the opening 123 of the gasket 120 had the same area as that of the flow control hole 125, the flow shown by arrow ① in the jacket portion 26b would be prevented from smoothly flowing upward by the flow shown by arrow ② in the jacket 26c positioned above. The coolant thus could stagnate in a portion shown by mesh ④ of the cylinder head coolant jacket 26. The stagnating portion would be close to the ceiling portion of the combustion chambers 19, especially to the ignition plug 22 shown in FIG. 4 as an ignition point, and thus would affect the cooling function, decreasing cooling efficiency.

Since the hole diameter of the flow control holes 125 is smaller than the other openings 123 as described above, the flow amount of the coolant shown by arrow ② is smaller than the flow amount of the coolant shown by arrow ①so that the coolant flow of arrow ① is smooth in the meshed portion, smoothly merging with the flow of arrow ②, and flows out in the direction of the cylinder block as shown by arrow ①. This prevents the stagnation of the coolant, providing reliable and effective cooling, and thereby increasing the engine performance.

Figure 24:
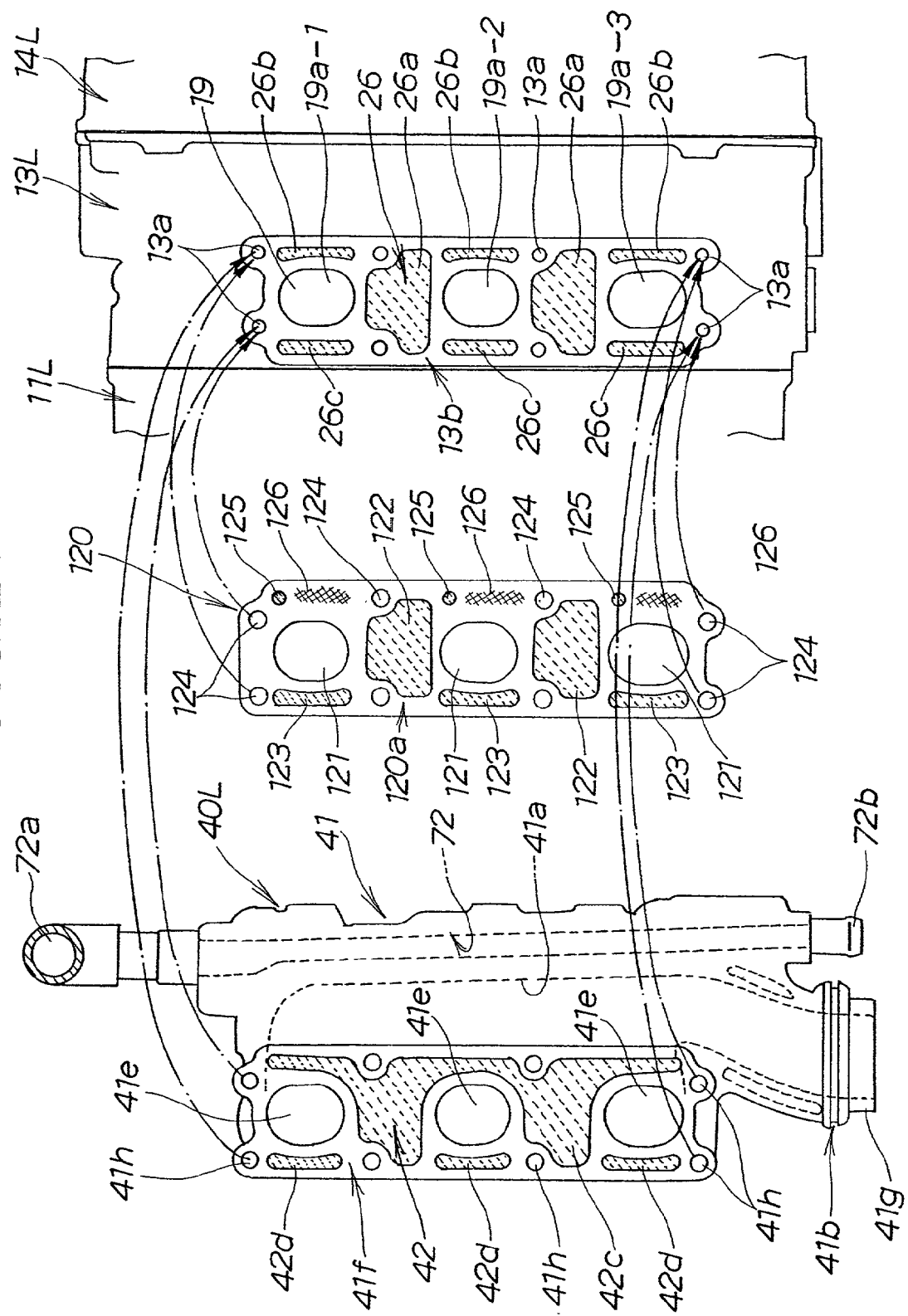
FIG. 24 is an exploded view illustrating the connection of the gasket and the exhaust manifold to the left cylinder head.
Figure 25:
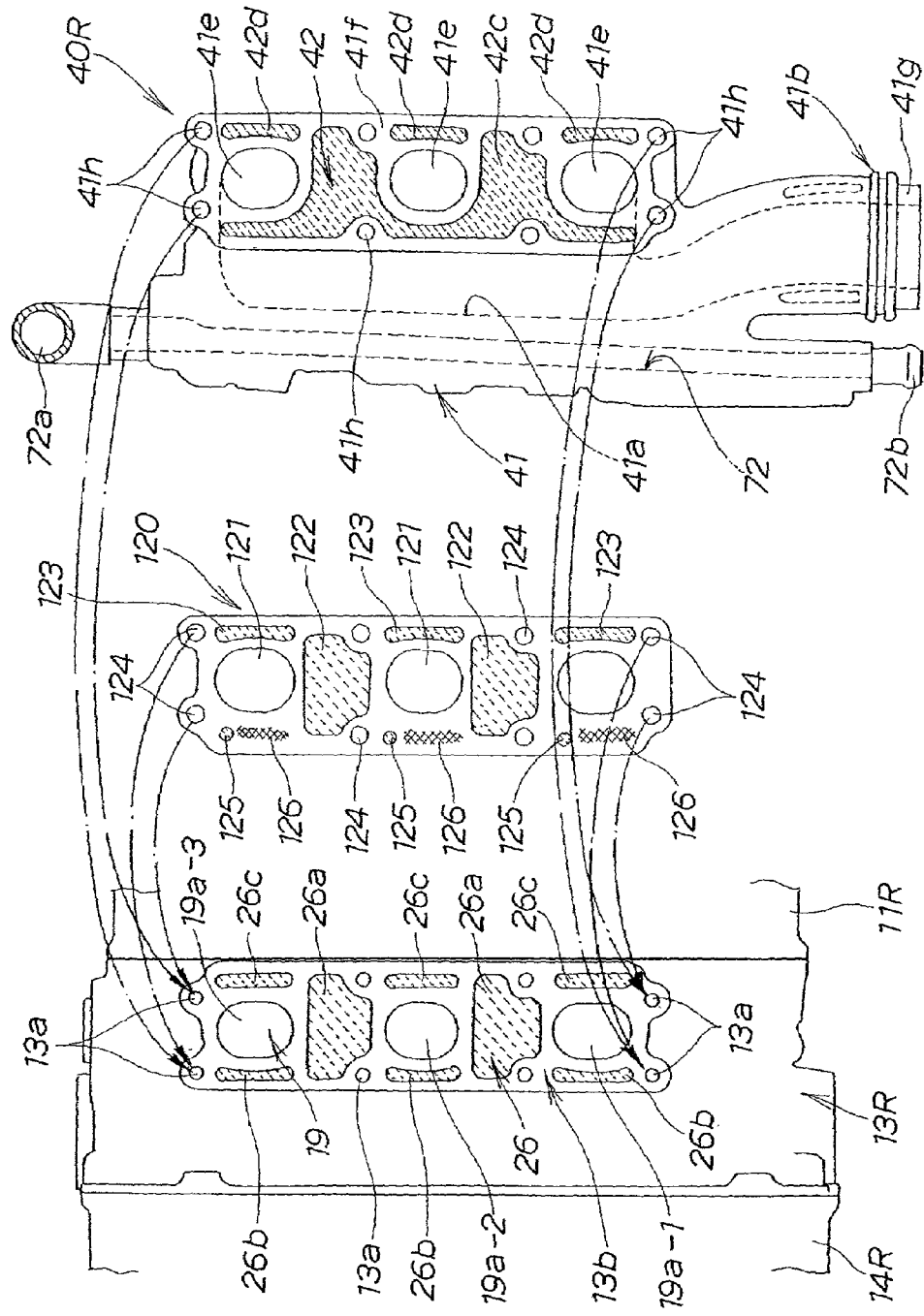
FIG. 25 is an exploded view illustrating the connection of the gasket and the exhaust manifold to the right cylinder head.

Each flow control hole 125 is provided in an upper portion of one side of the exhaust passage opening 121, the exhaust passage 19a, and the exhaust passage 41a of the exhaust manifold 40 shown in FIG. 3 (41e shown in FIGS. 24 and 25). Although there is a possibility that air stagnate in upper portions or circumferential upper portions of the exhaust passages of the cylinder head and the exhaust manifold, the flow control hole 125 provided in an upper portion of the opening facilitates evacuation of air, preventing the deterioration of the cooling performance due to air mixed in the coolant.

Figure 18:
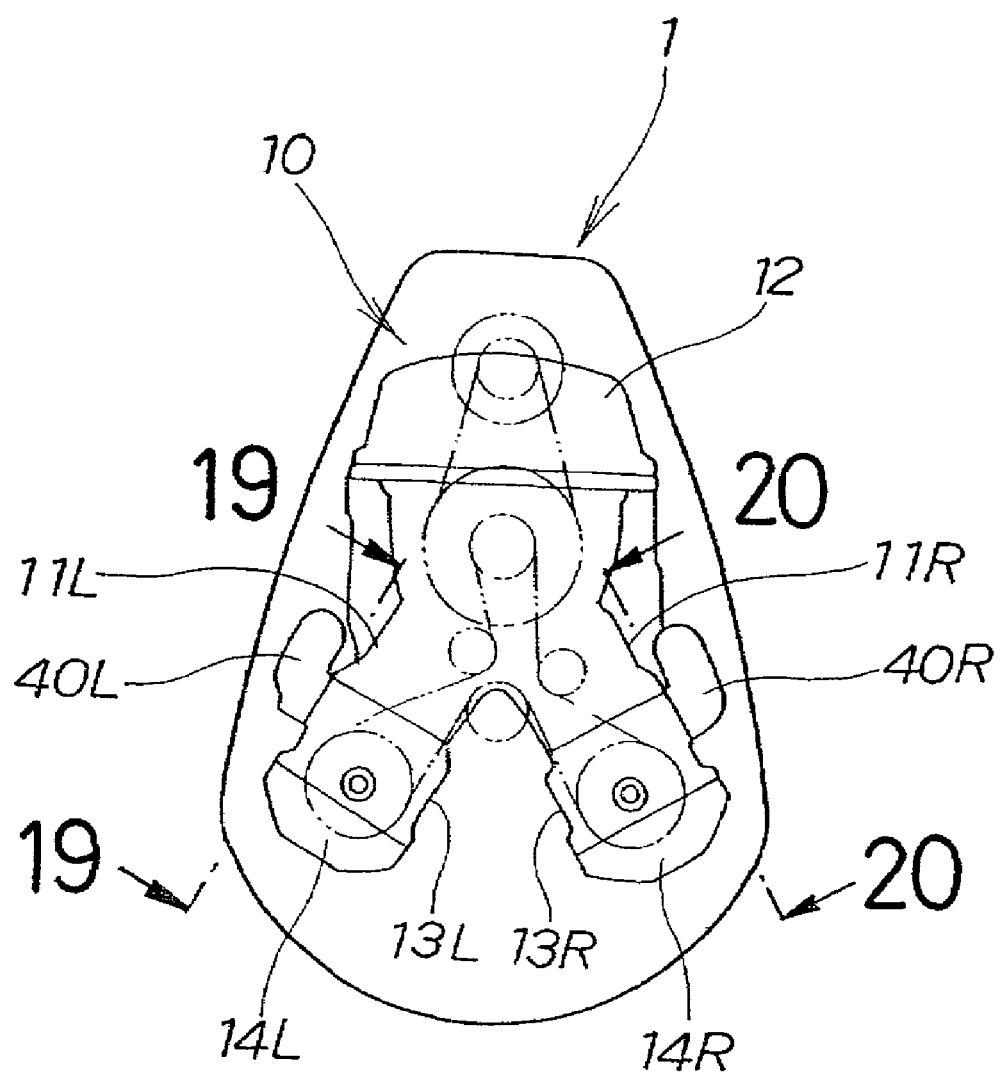
FIG. 18 is a schematic diagram of FIG. 14, illustrating indication lines of cross sections of cylinder heads.

FIG. 18 is a schematic diagram of FIG. 14, illustrating indication lines for cross sections of the cylinder head.

The figure shows the left and right cylinder blocks 11L, 11R, cylinder heads 13L, 13R and cylinder head covers 14L, 14R assembled into left and right banks extending rearward in a V shape in a plan view.

Figure 19:
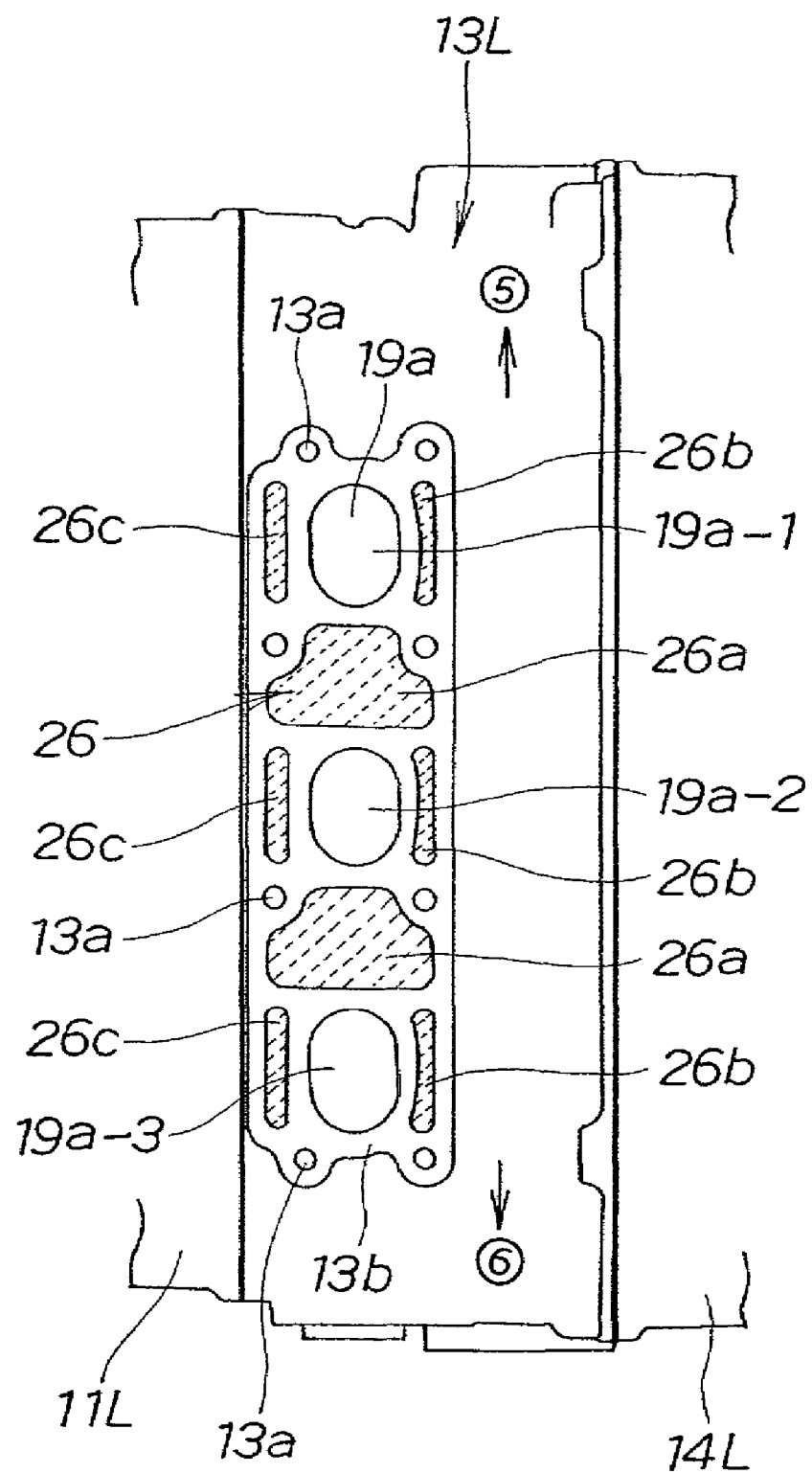
FIG. 19 is a cross-sectional view taken along line 19—19 in FIG. 18, illustrating a mating surface of the left cylinder head.

FIG. 19 is a diagram of a mating surface of the cylinder head taken along line 19—19 in FIG. 18, viewing the cylinder head 13L in the direction of arrows of the indication lines. FIG. 19 corresponds to FIG. 15.

Arrow ⑤ indicates the upper direction of the mating surface having the openings 19a and 26a to 26c, and ⑥ indicates the lower direction. Thus the opening 19a-1 is upper and the opening 19a-3 is lower. The openings 26b of the jacket portions is right in the figure and the other openings 26c are left in the figure.

Figure 20:
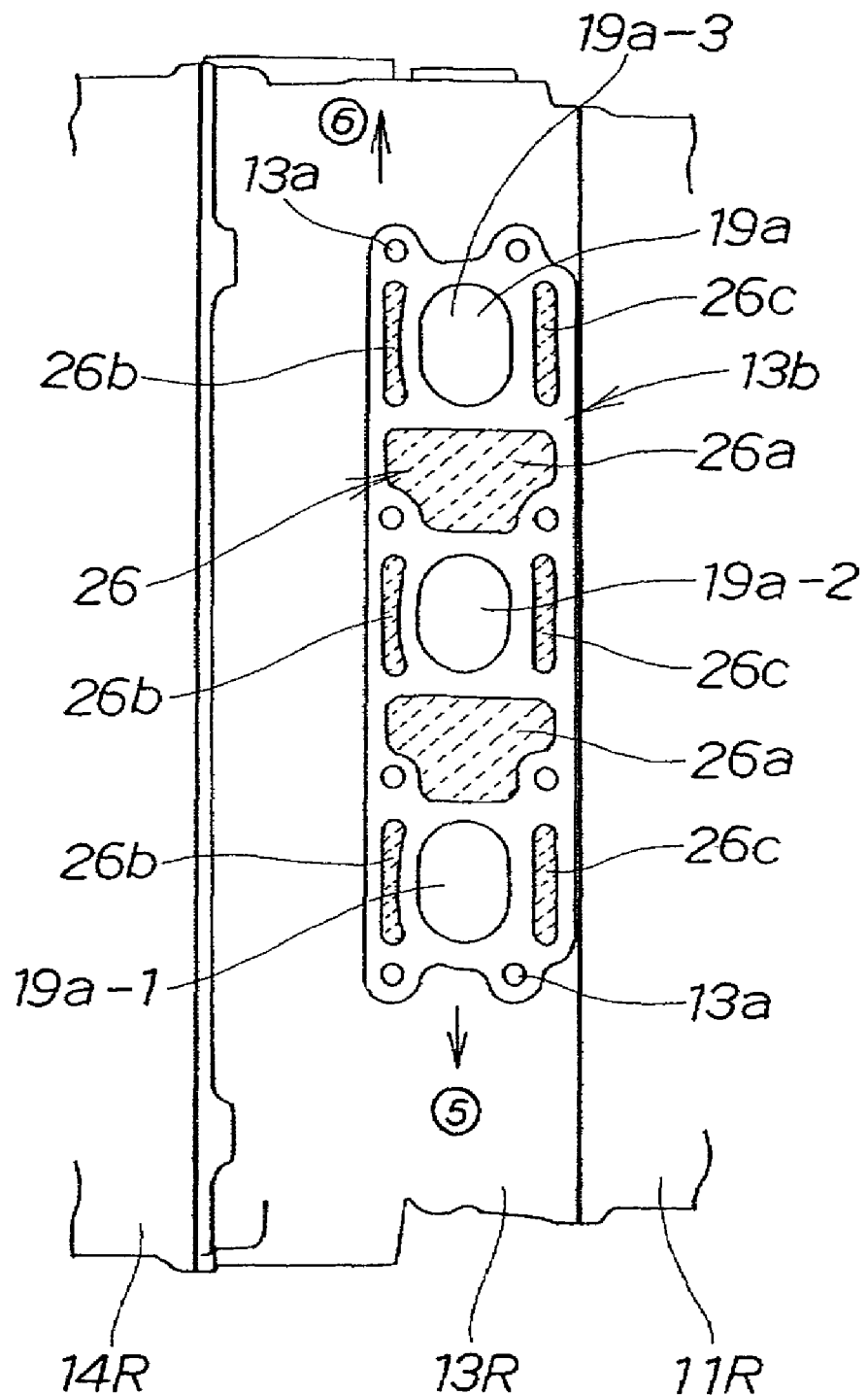
FIG. 20 is a cross-sectional view taken along line 20—20 in FIG. 18, illustrating a mating surface of the right cylinder head.

FIG. 20 is a diagram of a mating surface of the cylinder head taken along line 20—20 in FIG. 18, viewing the cylinder head 13R in the direction of arrows of the indication lines. FIG. 20 shows the mating surface 13b shown in FIGS. 15 and 19 inverted.

That is, the upper opening 19a-1 shown in FIG. 19 is inverted to be lower in the direction of ⑤ and the lower opening 19a-3 is inverted to be upper in the direction of ⑥.

Thus the right cylinder head 13R is inverted upside down with respect to the left cylinder head 13L.

The openings 19a and 26a to 26c disposed vertically in the mating surface 13b are symmetrical with respect to the center line CL (See FIG. 15), having the same opening positions when inverted.

Thus the left and right cylinder heads 13L, 13R can be the same cylinder heads.

The inversion of the cylinder head 13 can make the left and right banks the same with 13L, 13R.

When the left and right banks have the identical cylinder heads, the coolant passing in the cylinder heads 13L, 13R is performed in the identical positions with respect to the exhaust passage openings of the left and right banks, enabling the identical cooling conditions in the left and right banks. In other words, since the passing of coolant does not largely changes the cooling conditions around the exhaust passages, one cylinder head can be inverted upside down to be used as the other cylinder head.

In this embodiment, no connecting opening for coolant is provided right above the uppermost exhaust opening 19a or right below the lowermost opening 19a. Such opening may be provided in a position right above or right below the uppermost or lowermost opening 19a.

Figure 21:
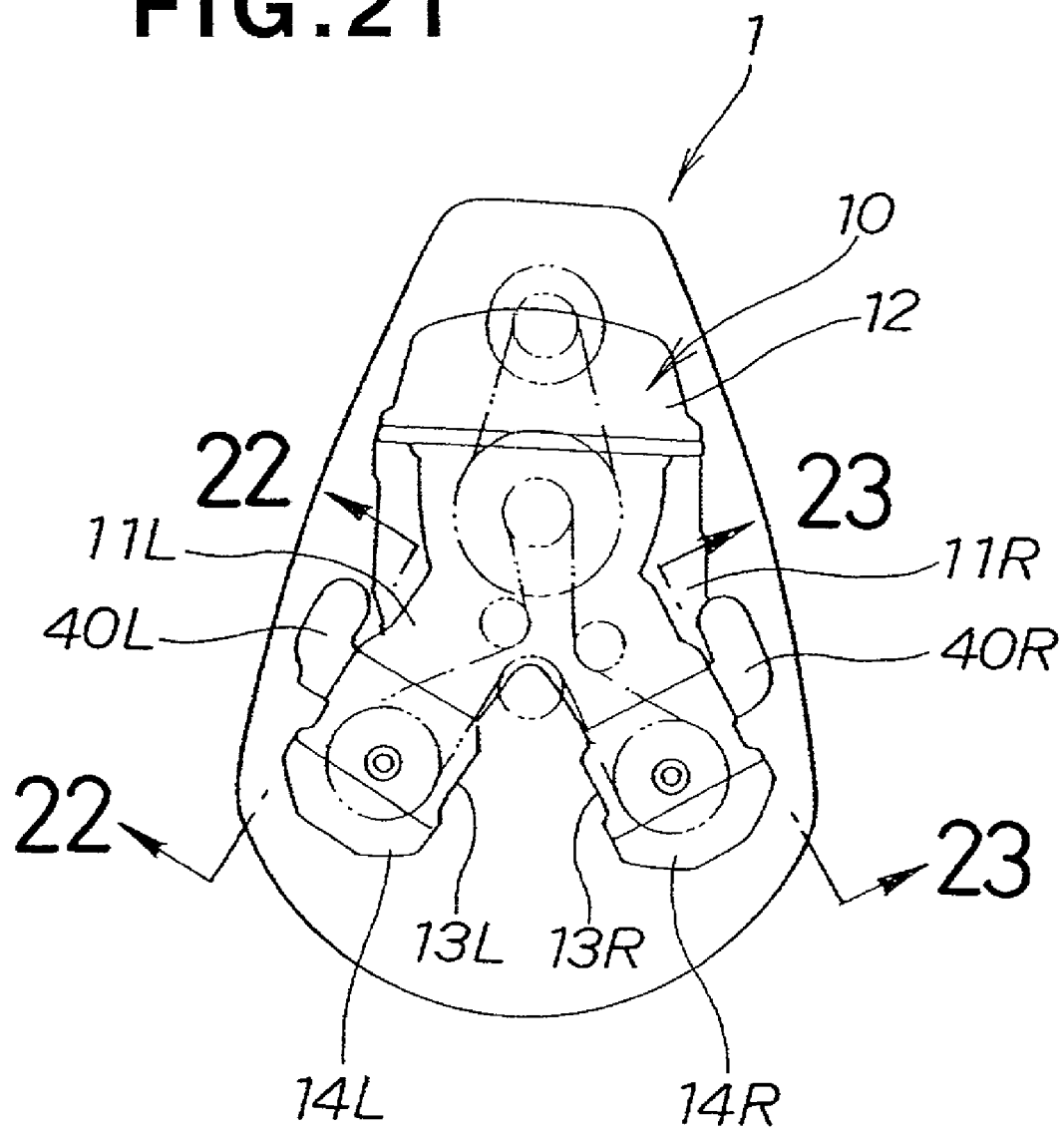
FIG. 21 is a schematic diagram of FIG. 14, illustrating indication lines of cross sections of exhaust manifolds.

FIG. 21 is a schematic diagram of FIG. 14, illustrating indication lines for cross sections of the exhaust manifold.

Figure 22:
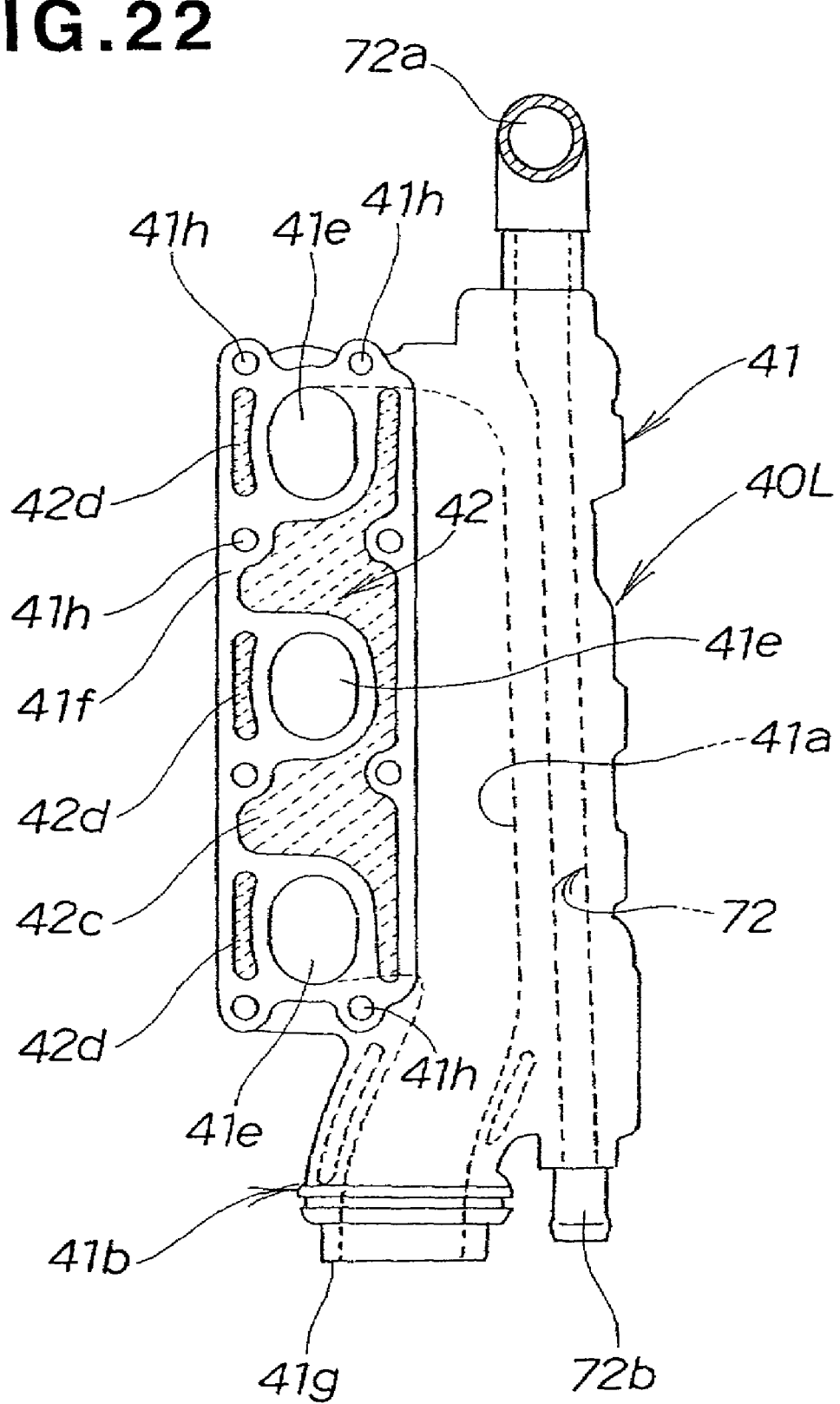
FIG. 22 is a cross-sectional view taken along line 22—22 in FIG. 21, illustrating a mating surface of the left exhaust manifold.

FIG. 22 is a diagram of a mating surface of the exhaust manifold taken along line 22—22 in FIG. 21, viewing the exhaust manifold 40L in the direction of arrows of the indication lines.

The left exhaust manifold 40L is integrally mounted and joined to the above-described left cylinder head 13L, and has on the body 41 a mating surface 41f corresponding to the cylinder head 13L. The mating surface 41f has eight connecting holes 41h in total in the four corners and left and right portions.

As shown in FIG. 22, the mating surface 41f has vertically three exhaust openings 41e (parts of the vertically extending exhaust passage 41a, which are denoted by the different reference numeral) communicating with the exhaust passage 41a. The openings 41e correspond to the exhaust openings 19a-1 to 19a-3 of the cylinder head 13.

Openings positioned right of the exhaust openings 41e and openings 42c of the coolant jacket 42 positioned between the openings 41e constitute a continuous opening. Vertically elongate openings 42d communicating with the openings 42c of the coolant jacket 42 are provided left of the exhaust openings 41e.

The exhaust passage 41a opens downward, and a downstream portion 41g thereof constitutes the lower portion 41b of the exhaust manifold body 41 to be connected to an upstream end of the intermediate exhaust pipe 54 shown in FIG. 5.

A drain passage 72 for coolant is vertically extended through an outer portion (right side portion in the figure) with respect to the exhaust passage 42 in the body 41 of the exhaust manifold 40. The drain passage 72 is a passage for cooling the cylinders 15 formed in the cylinder block 11 as shown in FIG. 13 and then draining the coolant.

The drain passage 72 has a connecting part 72a at its upper end. The drain passage 72 is connected via the pipe 70 for communication with the thermostat cover 69 of the thermostat valve device 71 as shown in FIGS. 12 and 13. A lower end portion 72b of the drain passage 72 is connected to a drain passage to the outside. The lower end portion 72b is, as shown in FIG. 12 in this embodiment, connected via the L-shaped joint 73 to the drain passage 74 opening into the body case of the mounting case 50.

Figure 23:
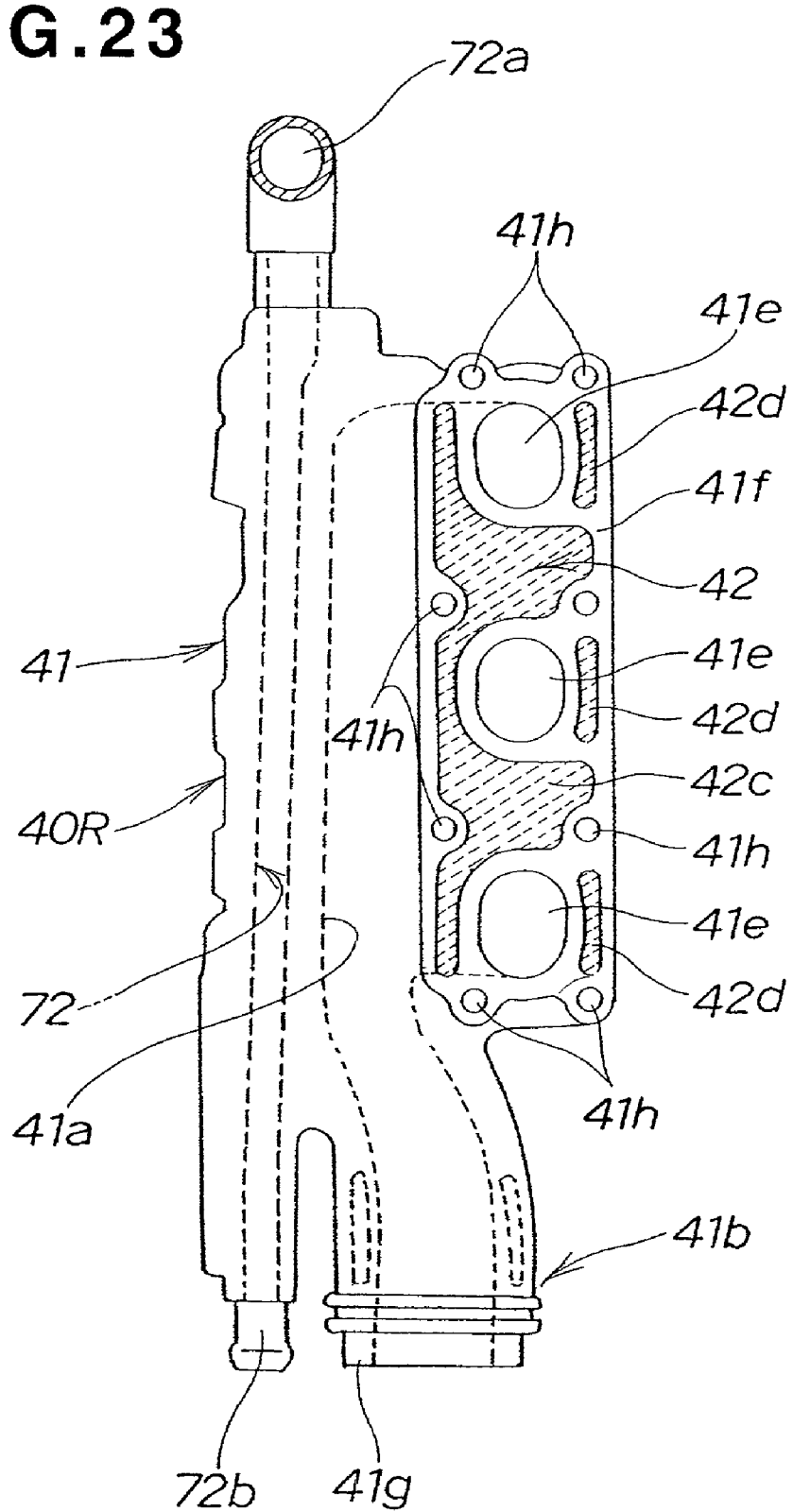
FIG. 23 is a cross-sectional view taken along line 23—23 in FIG. 21, illustrating a mating surface of the right exhaust manifold.

FIG. 23 is a diagram of a mating surface of an exhaust manifold taken along line 23—23 in FIG. 21, illustrating the right exhaust manifold 40R, in which the left exhaust manifold 40 is formed in a shape and structure corresponding to a cylinder head inverted upside down.

The cylinder heads 13L, 13R are the same cylinder head 13 inverted upside down for use. The left and right exhaust manifolds 40, 40 are, however, prepared as different ones.

Thus the same components are disposed symmetrically and are denoted by the same reference numeral to avoid redundant description.

FIG. 24 illustrates the mounting of the left exhaust manifold 40L to the left cylinder head 13L via the gasket 120.

During the connection of the mating surface 41f of the left exhaust manifold 40L to the mating surface 13b of the left cylinder head 13L, the gasket 120 is interposed therebetween and the various openings formed in the mating surface 41*f* and the various openings formed in the mating surface 13*b* are aligned for connection.

The gasket 120 shown in FIG. 16 is inverted horizontally. The flow control holes 125 are positioned right. When the gasket 120 is joined to the mating surface 13*b* of the cylinder head 13L, the jacket openings 26*c* of the mating surface 13*b* of the cylinder head 13L except their upper portions corresponding to the flow control holes 125 are blocked by the shields 126. This prevents stagnant of coolant in the coolant jacket 26 in the circumference of the combustion chambers 19, as described with FIG. 17.

The exhaust manifold 40L is aligned with and laid on the mating surface 13*b* of the cylinder head 13L with the gasket 120 interposed therebetween as shown by chain lines. Bolts are inserted through the connecting holes 41*h*, 124 and 13*a* to combine the three components into a unit.

FIG. 25 illustrates the mounting of the right exhaust manifold 40R to the right cylinder head 13R via the gasket 120.

During the connection of the mating surface 41*f* of the exhaust manifold 40R to the right mating surface 13*b* of the right cylinder head 13R, the gasket 120 is interposed therebetwen, and the various openings formed in the mating surface 41*f* and the various openings formed in the mating surface 13*b* are aligned for connection. The gasket 120 is the same as illustrated in FIG. 16.

The gasket 120 is inverted to be joined to the mating surface 13*b* of the cylinder head 13R. The coolant jacket openings 26*c* except their upper portions corresponding to the flow control holes 125 in the mating surface 13*b* of the cylinder head 13R are blocked by the shields 126. Thus the stagnant of coolant in the coolant jacket in the circumference of the combustion chambers 19 shown in FIG. 17 is prevented.

The exhaust manifold 40R is aligned with and laid on the mating surface 13*b* of the cylinder head 13R with the gasket 12 interposed therebetween as shown by chain lines. Bolts are inserted through the connecting holes 41*h*, 124 and 13*a* to combine the three components.

Next, the details of the structure of the oil pan 60 will be described with reference to FIGS. 26 and 27. New reference numeral 160 is affixed to the oil pan for description.

Figure 26:
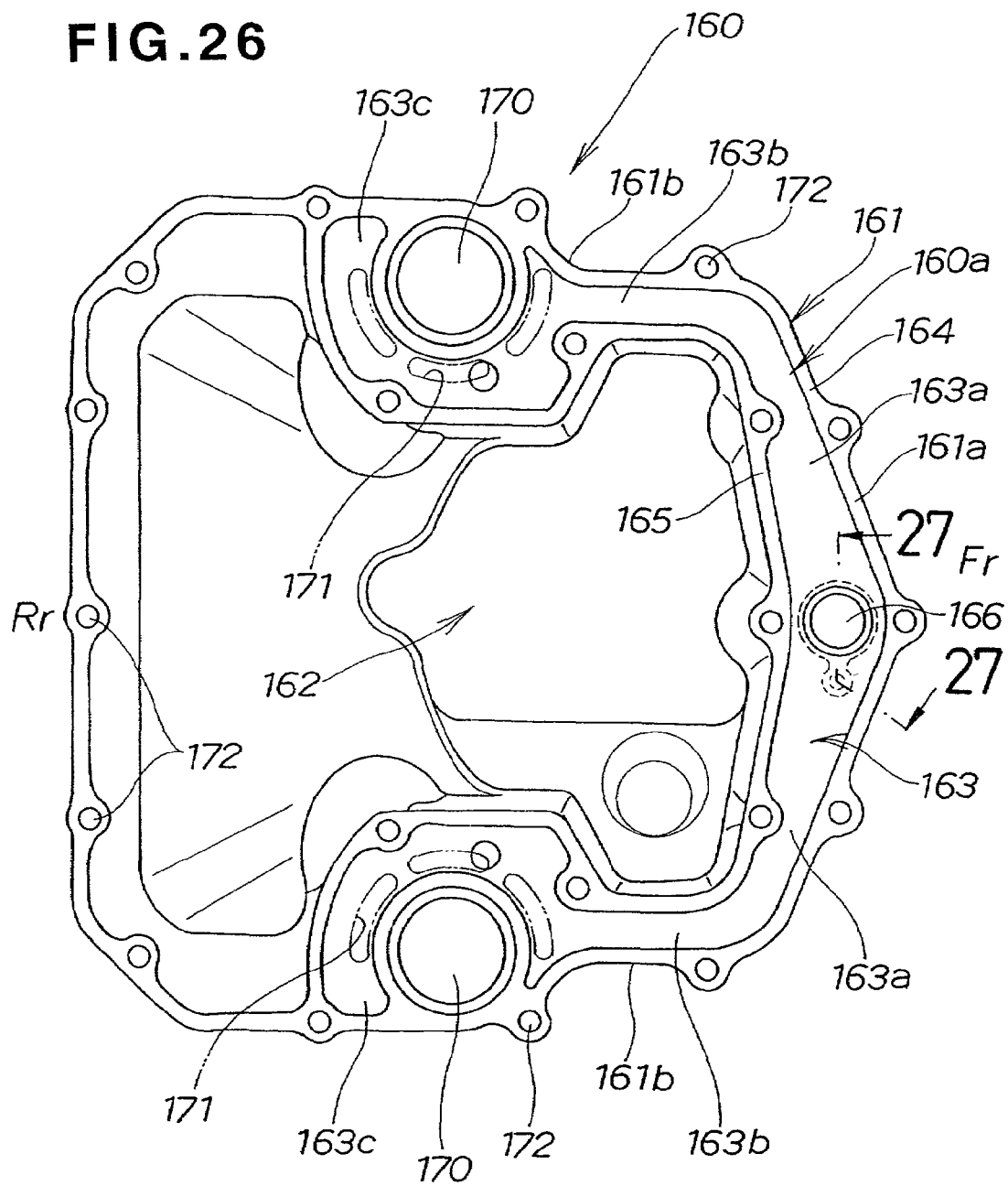
FIG. 26 is a plan view of an oil pan with an engine removed.

Referring to FIG. 26, the oil pan 160 has on its upper end periphery a mounting flange 161 for mounting the oil pan 160 to the engine. An oil accommodating depression 162 for accommodating oil is formed in a middle portion of the oil pan 160. The oil accommodating depression 162 bulges downward.

The front portion of the mounting flange 161 (right portion in FIG. 26) constitutes an extension 160*a* extending forward of the oil accommodating depression 162. The extension 160*a* has a front portion 161*a* and left and right portions 161*b*, 161*b* which are connected together via a passage 163 formed in a U shape. The passage 163 with a U-shaped cross section has an outside mounting end face 164 and an inside mounting end face 165 with which to define the outside of the oil pan 160 and the oil accommodating depression 162.

Figure 27:
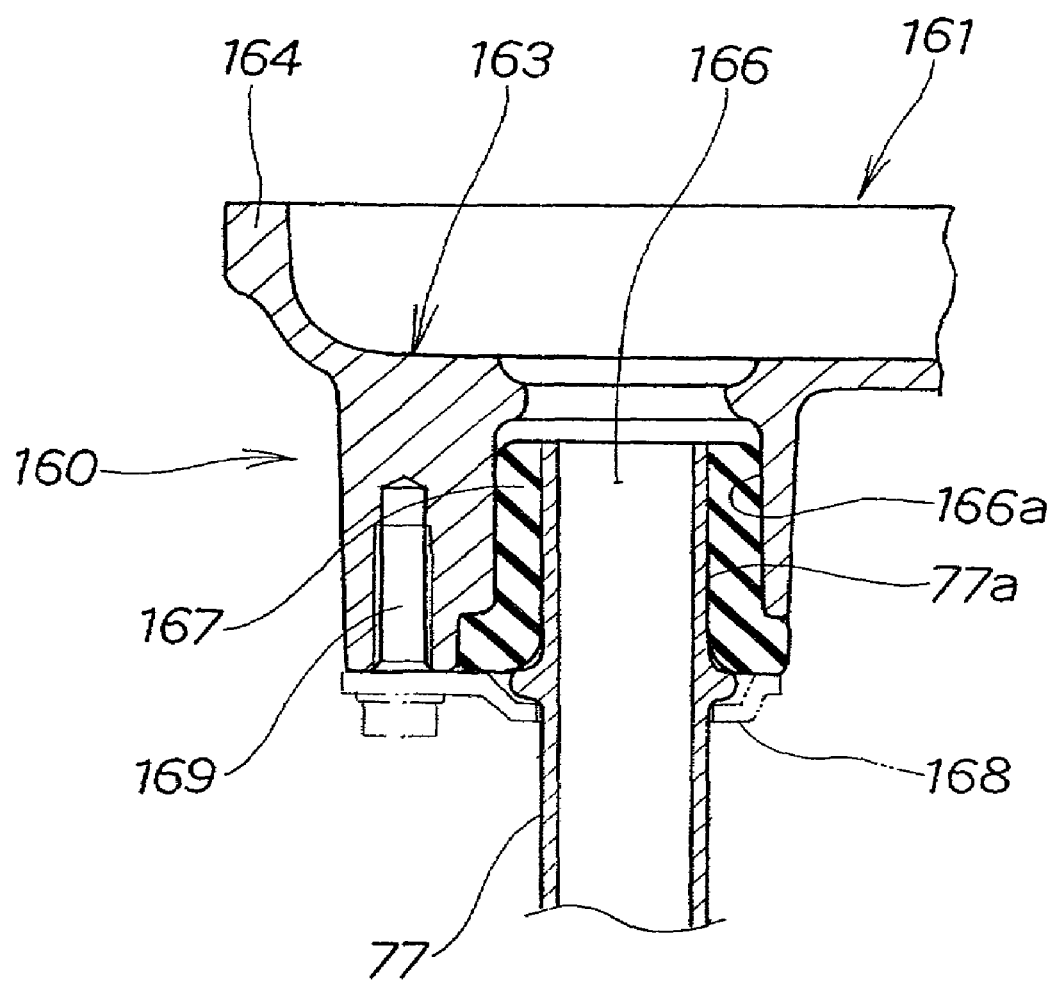
FIG. 27 is an enlarged cross-sectional view taken along line 27—27 in FIG. 26.

A coolant intake 166 connected to the coolant supply pipe 77 as shown in FIG. 27 is formed in a laterally middle front portion of the passage 163. Seawater or the like used as coolant is pumped by the pump 76 shown in FIG. 13 and is supplied via the coolant supply pipe 77 from the coolant intake 166 to the passage 163. The coolant intake 166 opens into the passage 163. An upper end portion 77*a* of the coolant supply pipe 77 is fitted to a hole 166*a* formed in the bottom of the passage 163 via a grommet 167. The coolant supply pipe 77 is fixed to the oil pan 160 via a toggle 168 and a bolt 169.

The passage 163 consists of left and right two branching passages 163*a*, 163*a* branched left and right from the coolant intake 166. The branching passages 163*a* have left and right extended passages 163*b*, 163*b* extending rearward from the left and right ends thereof. Arc end passages 163*c*, 163*c* are provided symmetrically at the rear portions of the extended passages 163*b* in a communicating manner. Circular holes 170, 170 are formed in middle portions of the end passages 163*c*, 163*c*, extending vertically therethrough. The intermediate exhaust pipes 54, 54 shown in FIG. 5 pass through the circular holes 170, 170. Reference numeral 171 denotes coolant jackets, shown by chain lines in the figure, of exhaust manifolds or the like provided above the oil pan 160. In FIG. 26, reference numeral 172 denotes bolt holes for connecting the oil pan 160 to the engine.

The oil pan 160 is made from cast aluminum alloy. Specifically, the mounting flange 161, passage 163, coolant intake 166, circular holes 170 constituting outlets and oil accommodating depression 162 are integrally formed by casting. Thus a coolant passage, an intake of outside water (seawater, for example) and outlets can be formed without machining such as drilling.

The intake 166 of the coolant pumped from the coolant supply pipe 77 is formed in an intersection point of the left and right two branching passages 163*a*, 163*a*. When the outboard motor 1 is tilted up as shown by chain lines in FIG. 1, the coolant intake 166 shown in FIG. 26 is inclined downward, and coolant discharged from the coolant jackets of the engine components is speedily drained from the coolant intake 166.

The present disclosure relates to the subject matters of Japanese Patent Applications No. 2001-144804, filed May 15, 2001, No. 2001-265955, filed Sep. 3, 2001, No. 2001-265905, filed Sep. 3, 2001, and No. 2001-266390, filed Sep. 3, 2001, the disclosures of which are expressly incorporated herein by reference in their entireties.

What is claimed is:

1. An outboard motor comprising:
   an engine subassembly including a cylinder head constituting part of a combustion chamber and a cylinder block;
   a mounting case having a mating surface for connecting said engine subassembly thereto and a depression opening upward;
   an extension case forming an exhaust expansion chamber below said mounting case;
   an exhaust manifold having an exhaust passage communicating with an exhaust port of said cylinder head;
   a cover covering an opening of said depression to form a coolant chamber;
   an inner passage passing through said coolant chamber, communicating with said exhaust passage of said exhaust manifold and with said exhaust expansion chamber; and
   a member for introducing coolant into said coolant chamber.

2. An outboard motor as set forth in claim 1, wherein:
   said exhaust manifold has a coolant jacket, said coolant jacket communicating with said coolant chamber formed in said depression of said mounting case.

3. An outboard motor as set forth in claim 1, wherein:
   said cover is fixed to said mounting case via a bolt in a position except a region in an outermost position of said mounting case.

4. An engine exhaust passage connecting structure, comprising:
- a first exhaust passage member having a first exhaust passage;
- a second exhaust passage member having a second exhaust passage communicating with said first exhaust passage, said second member being connected to said first exhaust passage member;
- a connecting part of said first exhaust passage member, said connecting part having a wall defining said exhaust passage on an inner peripheral surface thereof and an annular protrusion formed outside said wall to be spaced apart from said wall;
- a connecting part of said second exhaust passage member, said connecting part having a wall defining said exhaust passage on an inner peripheral surface thereof and a wall in a region not defining said exhaust passage;
- a seal interposed between walls of said first and second exhaust passage members, said walls being distanced from said exhaust passage; and
- a coolant jacket formed outside said seal.

5. A connecting structure as set forth in claim 4, wherein:
said wall not defining said exhaust passage of said second exhaust passage member is an annular protrusion fitted into an annular depression formed in said first exhaust passage member.

6. A connecting structure as set forth in claim 4, wherein:
said first and second exhaust passage members have coolant jackets on the outer peripheries of said exhaust passages, said coolant jackets communicating with one another, constituting part of said coolant jacket outside said seal.

7. A connecting structure as set forth in claim 4, wherein:
said engine is a marine engine; and
water outside a body accommodating said engine inside is introduced into said coolant jacket.

8. A connecting structure as set forth in claim 4, wherein:
said annular protrusion of said first exhaust passage member has an engaging part formed on an outer peripheral surface thereof; and
a part of a fitting portion of said seal fitted onto said annular protrusion is engaged with said engaging part.

9. A connecting structure as set forth in claim 8, wherein:
said seal is provided over at least two surfaces of an outer peripheral surface with said engaging part formed on said annular protrusion and an end surface of said annular protrusion.

10. A V-type vertical engine, comprising:
a crankshaft disposed substantially vertically;
cylinder blocks having a plurality of cylinders housing connecting rods connected to said crankshaft and pistons, said cylinders being aligned vertically with the axes forming a V in a plan view;
two cylinder heads provided on said cylinder blocks, said cylinder heads having exhaust ports, respectively; and
exhaust manifolds fixed to said cylinder heads, said manifolds having exhaust passages communicating with said exhaust ports, wherein:
each of said cylinder heads has a coolant jacket and a mating surface for connecting said manifold thereto, said mating surface being formed with openings of said coolant jacket;
each of said exhaust manifolds has a coolant jacket and a mating surface to be connected to said cylinder head, said mating surface being formed with openings of said coolant jacket; and
said openings formed in said mating surface of said cylinder head are formed substantially symmetrically with respect to the horizontal center line of said mating surface.

11. An engine as set forth in claim 10, further comprising:
a thermostat valve provided to an assembly of said cylinder head and said cylinder block;
an exhaust manifold positioned downstream of said thermostat valve and having a drain passage; and
a pipe interposed between said thermostat valve and said exhaust manifold for communication between a passage with said thermostat valve provided thereto and said drain passage.

12. An outboard motor with a V-type vertical engine mounted thereto, comprising:
a crankshaft disposed substantially vertically;
cylinder blocks having a plurality of cylinders housing connecting rods connected to said crankshaft and pistons, said cylinders being aligned vertically with the axes forming a V in a plan view;
two cylinder heads provided on said cylinder blocks, said cylinder heads having exhaust ports, respectively; and
exhaust manifolds fixed to said cylinder heads, said exhaust manifolds having exhaust passages communicating with said exhaust ports, wherein:
each of said cylinder heads has a coolant jacket and a mating surface for connecting said manifold thereto, said mating surface being formed with openings of said coolant jacket;
each of said exhaust manifolds has a coolant jacket and a mating surface to be connected to said cylinder head, said mating surface being formed with openings of said coolant jacket; and
said openings formed in said mating surface of said cylinder head are formed substantially symmetrically with respect to the horizontal center line of said mating surface.

13. An outboard motor as set forth in claim 12, further comprising:
a thermostat valve provided to an assembly of said cylinder head and said cylinder block;
an exhaust manifold positioned downstream of said thermostat valve and having a drain passage; and
a pipe interposed between said thermostat valve and said exhaust manifold for communication between a passage with said thermostat valve provided thereto and said drain passage.

14. A water-cooled engine, comprising:
a cylinder head having first exhaust passages with openings, a first coolant jacket, and a plurality of openings of said first coolant jacket provided around said openings of said first exhaust passages;
an exhaust manifold having second exhaust passages with openings, a second coolant jacket, and a plurality of openings of said second coolant jacket provided around said openings of said second exhaust passages; and
a flow controller for reducing the flow amount of coolant at a desired one of said openings of said first coolant jacket in said cylinder head as compared with that of the other openings.

15. An engine as set forth in claim 14, wherein:
a gasket is interposed between said first coolant jacket of said cylinder head and said second coolant jacket of said exhaust manifold; and
at least one of a plurality of openings of said coolant jacket provided in said gasket is a through hole constituting said flow controller.

16. An engine as set forth in claim 15, wherein:
said through hole constituting said flow controller is provided in an upper portion of said coolant jacket corresponding to one cylinder.

17. An engine as set forth in claim 14, comprising:
a crankshaft disposed substantially vertically;
cylinder blocks having a plurality of cylinders housing connecting rods connected to said crankshaft and pistons, said cylinders aligned vertically with the axes forming a V in a plan view; and
two cylinder heads provided on said cylinder blocks, respectively.

18. An outboard motor with a water-cooled engine mounted thereto, comprising:
a cylinder head having first exhaust passages with openings, a first coolant jacket, and a plurality of openings of said first coolant jacket provided around said openings of said first exhaust passages;
an exhaust manifold having second exhaust passages with openings, a second coolant jacket, and a plurality of openings of said second coolant jacket provided around said openings of said second exhaust passages; and
a flow controller for reducing the flow amount of coolant at a desired one of said openings of said first coolant jacket in said cylinder head as compared with that of the other openings.

19. An outboard motor as set forth in claim 18, wherein:
a gasket is interposed between said first coolant jacket of said cylinder head and said second coolant jacket of said exhaust manifold; and
at least one of a plurality of openings of said coolant jacket provided in said gasket is a through hole constituting said flow controller.

20. An outboard motor as set forth in claim 19, wherein:
said through hole constituting said flow controller is provided in an upper portion of said coolant jacket corresponding to one cylinder.

21. An outboard motor as set forth in claim 18, wherein:
said engine is a V-type vertical engine comprising:
a crankshaft disposed substantially vertically;
cylinder blocks having a plurality of cylinders housing connecting rods connected to said crankshaft and pistons, said cylinders being aligned vertically with the axes forming a V in a plan view; and
two cylinder heads provided on said cylinder blocks, respectively.

22. An outboard motor with a water-cooled V-engine, comprising:
a V-engine having left and right banks;
a coolant supply pipe supplying outside water pumped by a single pump as coolant to coolant jackets formed in said left and right banks, respectively; and
an oil pan positioned below said engine, said oil pan having a mounting flange to be mounted to said engine, wherein:
said mounting flange has an extension extending in a forward direction of said outboard motor, said extension being formed with a depression opening upward, said depression extending in left and right directions of said engine;
an intake of said coolant supply pipe is connected to an intersection point of said left and right depression extensions; and
outlets of coolant from said coolant jackets of said left and right banks are provided in rear portions of said depression extensions, opposite to said intersection point.

* * * * *